US008503396B2

(12) United States Patent
Blanchette et al.

(10) Patent No.: US 8,503,396 B2
(45) Date of Patent: *Aug. 6, 2013

(54) NETWORK APPARATUS ENABLING ROAMING ACROSS SUBNETS

(75) Inventors: Richard H. Blanchette, Hopkinton, MA (US); Martin Bouchard, Montréal (CA); Anil Gupta, Shrewsbury, MA (US); Yannick Koehler, Montréal (CA); Gilbert Moineau, Lachine (CA); Fréderic D. Mouveaux, Laval (CA); Roger D. Sands, Princeton, MA (US); Pierre Trudeau, Lorraine (CA)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 13/198,084

(22) Filed: Aug. 4, 2011

(65) Prior Publication Data

US 2012/0039230 A1    Feb. 16, 2012

Related U.S. Application Data

(62) Division of application No. 11/646,904, filed on Dec. 28, 2006, now Pat. No. 8,018,900.

(60) Provisional application No. 60/755,664, filed on Dec. 30, 2005, provisional application No. 60/755,914, filed on Dec. 31, 2005.

(51) Int. Cl.
*H04W 4/00* (2009.01)
*H04H 20/71* (2008.01)
*H04L 12/66* (2006.01)
*H04L 12/28* (2006.01)
*H04B 1/16* (2006.01)

(52) U.S. Cl.
USPC ........... 370/331; 370/312; 370/328; 370/352; 370/401; 370/395.2; 455/436; 455/432.2

(58) Field of Classification Search
USPC .................................................. 370/312, 328
See application file for complete search history.

(56) References Cited

U.S. PATENT DOCUMENTS

| 6,947,469 | B2 | 9/2005 | Anderson et al. |
| 7,046,647 | B2 | 5/2006 | Oba et al. |
| 7,876,704 | B1 * | 1/2011 | Bims et al. .................... 370/254 |

(Continued)

OTHER PUBLICATIONS

XP-002459694, "Subnet Roaming with the RoamAbout Wireless Switch System".*

*Primary Examiner* — Patrick N. Edouard
*Assistant Examiner* — Timothy Pham

(57) ABSTRACT

To enable a network apparatus to detect L3 roaming users and to take appropriate forwarding actions, L3 knowledge is introduced inside an L2 bridge forwarding table in the network apparatus. As a client moves from a subnet associated with a first network element to a subnet associated with the network apparatus, a determination is made regarding whether the client is roaming by evaluating a source IP address within a L3 packet header within a first frame received at the network apparatus. If, as a result of the evaluating step, it is determined that the client is roaming, the L2 bridge forwarding table is configured to include a source MAC address of the client together with information identifying a destination interface for use in directing client data traffic back towards the subnet associated with the first network element.

20 Claims, 10 Drawing Sheets

U.S. PATENT DOCUMENTS

| | | |
|---|---|---|
| 2002/0136226 A1 | 9/2002 | Christoffel et al. |
| 2003/0104814 A1* | 6/2003 | Gwon et al. .................. 455/436 |
| 2004/0213260 A1 | 10/2004 | Leung et al. |
| 2005/0018637 A1* | 1/2005 | Karoubalis et al. ........... 370/338 |
| 2005/0113086 A1 | 5/2005 | Wilson |
| 2005/0138206 A1* | 6/2005 | Moreels et al. ............... 709/245 |
| 2006/0268834 A1 | 11/2006 | Bajic |
| 2007/0076661 A1* | 4/2007 | Lin et al. ....................... 370/331 |

* cited by examiner

| MAC (KEY) | Interface |
|---|---|
| MAC 1 | Interface X |
| MAC 2 | Interface X |
| MAC 3 | Interface Y |
| ... | ... |
| MAC n | Interface Z |

| Subnet (KEY) | | Home Interface |
|---|---|---|
| L3 Address | L3 NetMask | |
| L3 Address 1 | L3 NetMask 1 | Interface A |
| L3 Address 2 | L3 NetMask 2 | Interface A |
| L3 Address 3 | L3 NetMask 3 | Interface B |
| ... | ... | ... |
| L3 Address n | L3 NetMask n | InterfaceC |

*Fig. 8*

| Subnet (KEY) | | Home Interface | Matching |
|---|---|---|---|
| L3 Address | L3 NetMask | | |
| L3 Address 1 | L3 NetMask 1 | Interface A | Positive |
| L3 Address 2 | L3 NetMask 2 | Interface A | Positive |
| L3 Address 3 | L3 NetMask 3 | Interface B | Positive |
| ... | ... | ... | ... |
| L3 Address n | L3 NetMask n | InterfaceC | Negative |

*Fig. 9*

| MAC SRC/DST (KEY) | DST Interface | VLAN ID | VAP ID | Authorization | HOME Interface |
|---|---|---|---|---|---|
| MAC 1 | Interface X | None | 1 | Yes | Interface A |
| MAC 2 | Interface X | K | None | No | None |
| MAC 3 | Interface Y | W | 2 | Yes | None |
| ... | ... | ... | ... | ... | ... |
| MAC n | Interface Z | None | 3 | Yes | Interface A |

*Fig. 10*

| MAC SRC/DST (KEY) | DST Interface | DST Interface ID | VAP ID | Authorization | SRS Interface | SRS Interface ID |
|---|---|---|---|---|---|---|
| MAC 1 | Interface X | None | 1 | Yes | Interface A | M |
| MAC 2 | Interface X | K | None | No | None | None |
| MAC 3 | Interface Y | W | 2 | Yes | None | None |
| ... | ... | ... | ... | ... | ... | ... |
| MAC n | Interface Z | None | 3 | Yes | Interface A | N |

*Fig. 11*

| Subnet (KEY) | | | | |
|---|---|---|---|---|
| L3 Address | L3 NetMask | Home Interface | Home Interface ID | Matching |
| L3 Address 1 | L3 NetMask 1 | Interface A | M | Positive |
| L3 Address 2 | L3 NetMask 2 | Interface A | N | Positive |
| L3 Address 3 | L3 NetMask 3 | Interface B | None | Positive |
| ... | ... | ... | ... | ... |
| L3 Address n | L3 NetMask n | InterfaceC | None | Negative |

*Fig. 12*

NETWORK APPARATUS ENABLING ROAMING ACROSS SUBNETS

This application is a divisional of Ser. No. 11/646,904, filed Dec. 28, 2006 now U.S. Pat. No. 8,018,900, which is based on and claims priority to Ser. No. 60/755,664, filed Dec. 30, 2005, and Ser. No. 60/755,914, filed Dec. 31, 2005, all of which are incorporated by reference in their entireties.

BACKGROUND OF THE INVENTION

1. Technical Field

The present invention relates generally to wireless device networking and in particular to a method for fast roaming across subnets in a wireless network.

2. Background of the Related Art

Wireless local area network (WLAN) technologies and services are well-known. WLAN is based on IEEE 802.11 standards. Users access the WLAN using mobile devices (e.g., dual-mode cell phones, laptops, PDAs with a Wi-Fi NIC cards, or the like). A Wi-Fi infrastructure typically comprises one or more access points (APs) located in proximity to one another, and each AP provides a wireless service in a given area. An access control function typically is based in a bridge interface that aggregates (at a central point) traffic coming from various interfaces. A bridge (which may be implemented in software) serves the purpose of aggregating traffic from multiple interfaces and forwarding it to appropriate locations based on Layer 2 (L2) knowledge. Layer 2 refers to the Data Link layer of the commonly referenced multi-layered communication model, Open Systems Interconnection (OSI). The Data Link layer contains the address inspected by a bridge or switch. L2 messages are delivered as "frames." In contrast, Layer 3 (L3) refers to the third or Network layer of the OSI model, which is used to route data to different LANs and WANs based on network addresses. L3 messages are delivered as "packets" (as opposed to frames)

FIG. 1 depicts a bridge 100 having a central interface connecting together a set of interfaces 102a-c. When multiple interfaces are interconnected in this manner using a bridge structure, each packet coming in from an interface for forwarding is inspected and analyzed at the L2 level. This process is also referred to as "promiscuous mode," during which the bridge interface captures and analyzes all network packets received by its underlying managed interfaces. From there, an access point decides whether to forward the traffic further on, or to discard it, e.g., based on the different security features that must apply for a specific user.

Each time a packet enters the bridge interface, the internal bridge mechanism learns from it. In particular, the mechanism typically extracts given information, such as the source Medium Access Control (MAC) address, as well as the local interface from which the packet came. From this information, an internal database is populated, and the MAC address becomes the key of the database. This information is continuously refreshed, typically by every single packet that enters the bridge interface. FIG. 2 illustrates a representative bridge forwarding database. As a result of this inspection process, the bridge is very sensitive to any packet it sees at the L2 level. Thus, for example, every Address Resolution Protocol (ARP) or Internet Protocol (IP) packet encapsulated into an Ethernet frame affects the bridge table. A typical bridge forwarding database such as shown in FIG. 2 is the result of a learning phase for the bridge structure (such as shown in FIG. 1). The learning phase is a prerequisite for a successful and efficient forwarding phase. When a packet comes into the bridge structure and the learning processing is done, the packet is inspected again in the forwarding phase. In this phase, the bridge retrieves the destination MAC address from the packet and seeks a corresponding entry in the database. If an entry is found, the packet is forwarded to the corresponding interface that takes care of sending it over the network. If no entry is found, however, the packet is duplicated and forwarded on every bridge interface excluding the one where the packet was received.

With the recent introduction of WLAN service controller (SC) devices, it is now possible to support much more complex wireless infrastructures. As illustrated in FIG. 3a, for example, a Wi-Fi infrastructure comprises a set of access points 302a-b connected to a service controller (SC) 304 through a L2 switch 306. In this example, the service controller 304 is associated with a subnet and manages the access points that are connected thereto. In particular, each AP connected to the SC reports its status and the identity of the connected clients. The L2 switch 306 includes a bridge, typically implemented in software. In this case, a VAP user (a mobile device) 308 is forwarded to a central device (such as a server that performs RADIUS-compliant AAA services) for authentication and authorization. FIG. 3b illustrates the client 308 roaming from access point 302a to access point 302b in the same subnet. This is distributed L2 roaming.

As topologies increase in size, however, there is a need to seamlessly support and manage clients as they roam between access points across multiple subnets, including without limitation with respect to subnets that are managed by different service controller devices. Note that the term "roam" (or "roaming") in this context (and in the context of the invention) is sometimes referred to as a "handover." As seen in FIG. 4, in this scenario, it is assumed that there are four (4) basic entities: a home AP 400, a home SC 402, a foreign AP 404, and a foreign SC 406. The home AP 400 is an access point in the home subnet of a wireless client where the client device usually is hosted. The home SC 402 is the device controlling the home AP for a roaming client (in this case client 408). The home service controller 402 may or may not be in the same subnet as the home AP. The foreign AP 404 is an access point with which a client connects while roaming outside of its home subnet. The foreign SC 406 is the service controller that controls the foreign AP.

In the prior art, it has not been possible to provide seamless handover (e.g., sub-50 millisecond roaming delay) as a client moves from a home subnet to a foreign subnet being managed by multiple service controllers such as shown in FIG. 4. This creates a potential performance issue, because the client device needs to preserve its current IP address at all times, which means that the access point in the foreign subnet cannot simply operate as a L2 bridge. In particular, when a user roams from an original subnet location to a foreign subnet, the foreign AP is the first device that detects the roaming. This detection is necessary for the AP to decide whether to handle the user locally or to force the user traffic to follow some other path (e.g., a dedicated path to the subnet master SC) for further action. Fundamentally, the AP is a wireless bridge and it functions at the L2 level. One way for the foreign AP to handle a new incomer (to the subnet) is to already know locally what to do with the traffic prior to its arrival. This type of solution requires management exchanges between all the devices (SCs and APs) that would have to configure the different network elements prior to the arrival of a roaming user. It also requires that all the MAC addresses learned by the bridge be approved by the SC before being used to pass traffic. Although L2 awareness and propagation inside the bridge tables is a solution that preserves the L2 nature of the bridge, it requires a synchronization of the devices throughout the network, significantly increasing processing time of a roaming user. This translates into the fact that user traffic must be blocked at the foreign AP until the knowledge of the user is in its bridge tables. This inconvenience is unacceptable in the context of fast roaming especially when supporting voice over IP (VoIP) phones or other such applications requiring a high quality of service (QoS) level.

The present invention addresses this need in the art.

BRIEF SUMMARY OF THE INVENTION

To enable devices to detect L3 roaming users and to take appropriate forwarding actions, L3 knowledge is introduced inside a bridge in a non-intrusive way. In particular, as a client moves from a subnet associated with a first network element to a subnet associated with a second network element, a determination is made regarding whether the client is roaming. This is done by evaluating a source IP address within a L3 packet header within a first frame received at the second network element. If, as a result of the evaluating step, it is determined that the client is roaming, an L2 bridge forwarding table in the second network element is configured to include a source MAC address of the client together with information identifying at least a destination interface for use in directing client data traffic back towards the subnet associated with the first network element. The first frame is then forwarded. In one embodiment, the traffic is directed back towards the subnet associated with the first network element via a GRE encapsulation tunnel, although any convenient tunneling mechanism can be used. According to another feature, given information cached at the foreign access point is used to enable the roaming client to continue to seamlessly receive inbound traffic prior to or during the configuration of the L2 bridge forwarding table (i.e., before any outbound traffic is actually sent from the client).

According to yet another aspect, a method is operative in a wireless infrastructure having at least an access point with which a client connects while roaming outside of the client's home subnet, and a controller that controls the access point. The method begins as the client first connects to the access point. In response, a Layer 2 (L2) bridge forwarding table in the access point is updated with the client's source MAC address and information identifying a L2 interface to the controller. Control messages (e.g., one or more IAPP messages) are exchanged between the access point and the controller to enable tunneling of unicast, multicast or broadcast frames for the roaming client towards the access point. Client traffic directed toward the home subnet is tunneled (e.g., via Generic Routing Encapsulation (or GRE)) from the access point to the controller through the L2 interface. In this embodiment, given information cached at the access point may be used to enable the client to receive the inbound traffic (unicast, multicast or broadcast frames) even prior to the updating step. According to a further feature, the controller may implement a similar L2 bridge forwarding table update functionality in the event it does not have direct L2 connectivity to the client's home subnet.

According to yet another aspect of the invention, a method is operative in a wireless infrastructure having a set of service controllers, with each service controller having associated therewith a set of one or more access points that it controls. The method begins by having each service controller identify its neighbor service controllers through some suitable means, such as manual configuration, passive scan reports generated by the access points, or observing roaming patterns and forming associated neighbor graphs. Each service controller then provides to its neighboring service controllers information identifying the one or more access points that it controls together with information identifying each client that has associated with any such access point. For a given service controller, a set of encapsulation tunnels is then established between the service controller; in particular, preferably an encapsulation tunnel is established between the given service controller and any neighbor service controller, as well as between the given service controller and each access point controlled thereby. As a client connects to a given access point associated with the given service controller and while roaming outside of the client's home subnet, a Layer 2 (L2) bridge forwarding table in the access point is then updated with the client's source MAC address and information identifying a L2 interface to the given service controller. Client traffic is then delivered from the given access point to the given service controller through the L2 interface and via the encapsulation tunnel.

According to another aspect of the invention, a method is operative in a wireless infrastructure having at least a foreign access point with which a client connects while roaming outside of the client's home subnet. In this aspect, the method includes several unordered steps. In particular, as the client roams from a home access point in the home subnet to the foreign access point in a foreign subnet, control messages (such as IAPP) are exchanged between the foreign access point and at least one controller to enable forwarding of inbound traffic to the client within a given roaming delay. As used herein, the roaming delay is measured as a time difference between a last successfully acknowledged IP packet at the home access point and a first successfully acknowledged IP packet at the foreign access point. Ai the client connects to the access point, the method then updates a Layer 2 (L2) bridge forwarding table in the access point with the client's source MAC address and information identifying a L2 interface to the controller. Outbound traffic is tunneled from the access point to the controller through the L2 interface. In a preferred embodiment, the given roaming delay is less than 50 milliseconds. Moreover, the home access point and the foreign access point may be controlled by a controller that controls both the home subnet and the foreign subnet; or, the home access point and the foreign access point may be controlled by at least first and second controllers, wherein each of the first and second controllers control different subnets.

The present invention facilitates support for large scale topologies where multiple subnets are managed throughout the network. Because roaming client L3 attributes (including the client's IP address) remain persistent (at least until a change is requested by the wireless client), when the user is located in a foreign subnet, traffic is forwarded transparently back to a user's home subnet at the L2 level so that it can be processed by local network elements. To carry traffic throughout the network to the appropriate local network elements, and as noted above, preferably a L2/L3 tunneling technology based on GRE is implemented. In particular, according to one embodiment of the present invention, L3 mobility uses GRE tunnels to encapsulate user traffic at the L2 level and put the traffic back on the same physical switch port as if the client was attached to an AP in its home subnet. In one embodiment, this is achieved by creating three (3) GRE tunnels: a first GRE tunnel from a foreign AP to a foreign SC, a second GRE tunnel from the foreign SC to a home SC, and a third GRE tunnel from the home SC to a home AP. Preferably, the GRE tunnels are established prior to the roam. With this configuration, preferably a given AP always tunnels the traffic not belonging to its own subnet to its controlling SC. Moreover, each device uses source address forwarding (e.g., a source MAC address in an L2 header of a de-encapsulated GRE packet) to find out the next device as the foreign subnet traffic is forwarded transparently back to a user's home subnet.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 8 is a L3 knowledge database;

FIG. 9 illustrates an enhanced bridge L3 knowledge database;

FIG. 10 illustrates a new bridge forwarding database;

FIG. 11 represents a preferred version of the bridge forwarding database;

FIG. 12 represents a preferred version of the L3 knowledge database;

DETAILED DESCRIPTION OF AN ILLUSTRATIVE EMBODIMENT

Figures 1, 2:
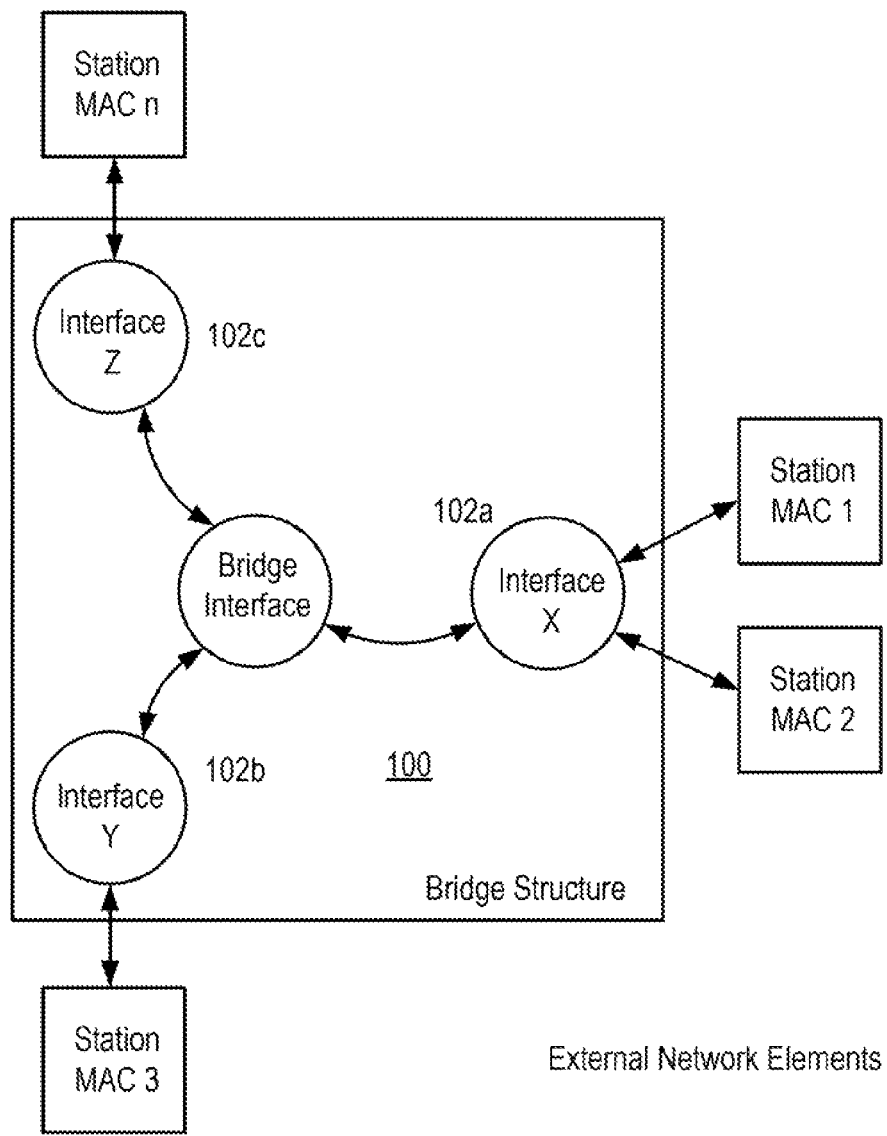
FIG. 1 illustrates a conventional L2 bridge with multiple interfaces.
FIG. 2 illustrates a bridge forwarding database.
Figure 3A:
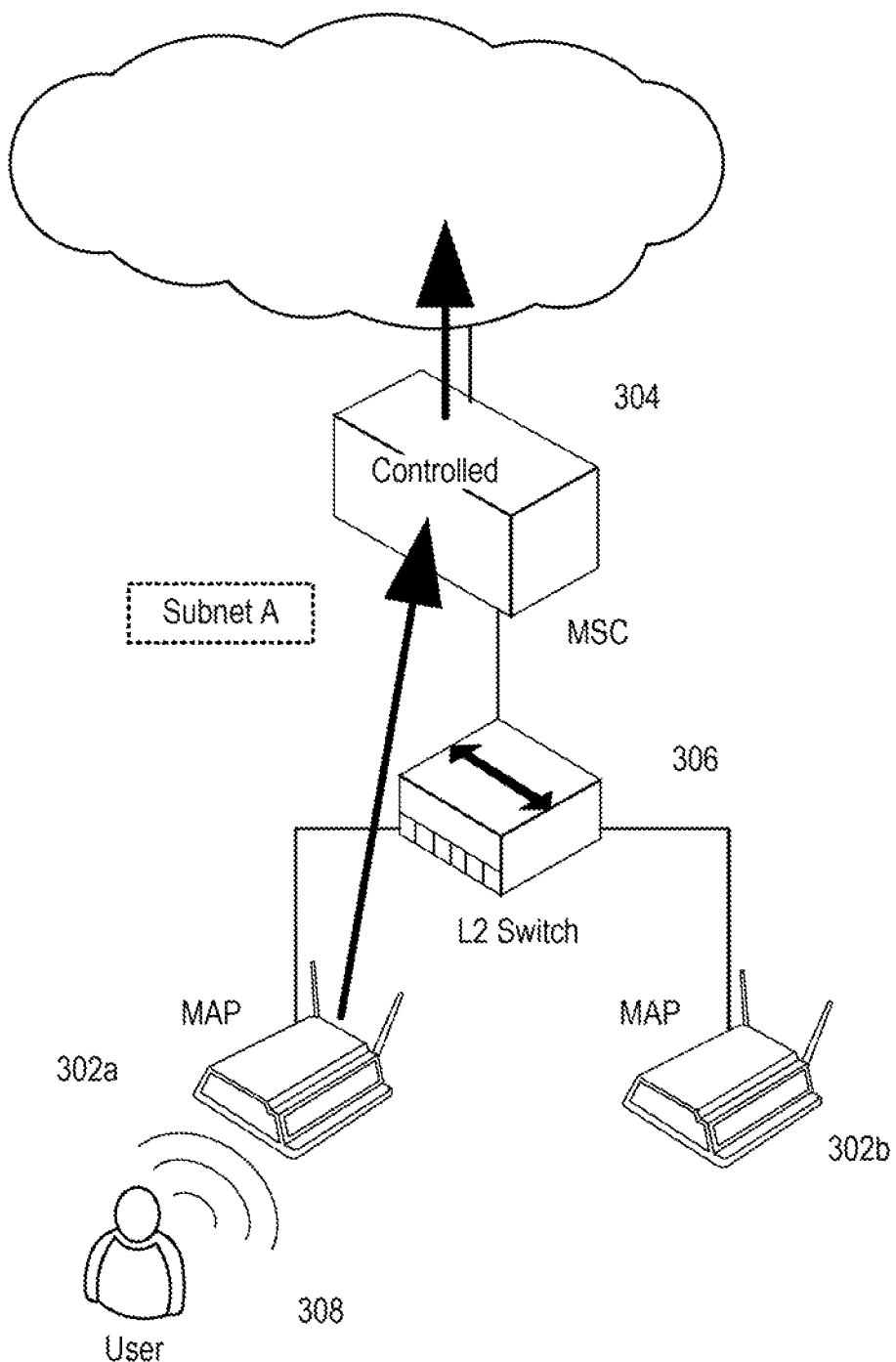
FIGS. 3a and 3b show a conventional Wi-Fi infrastructure in which a service controller is used to manage a set of access points within a given subnet.
Figure 3B:
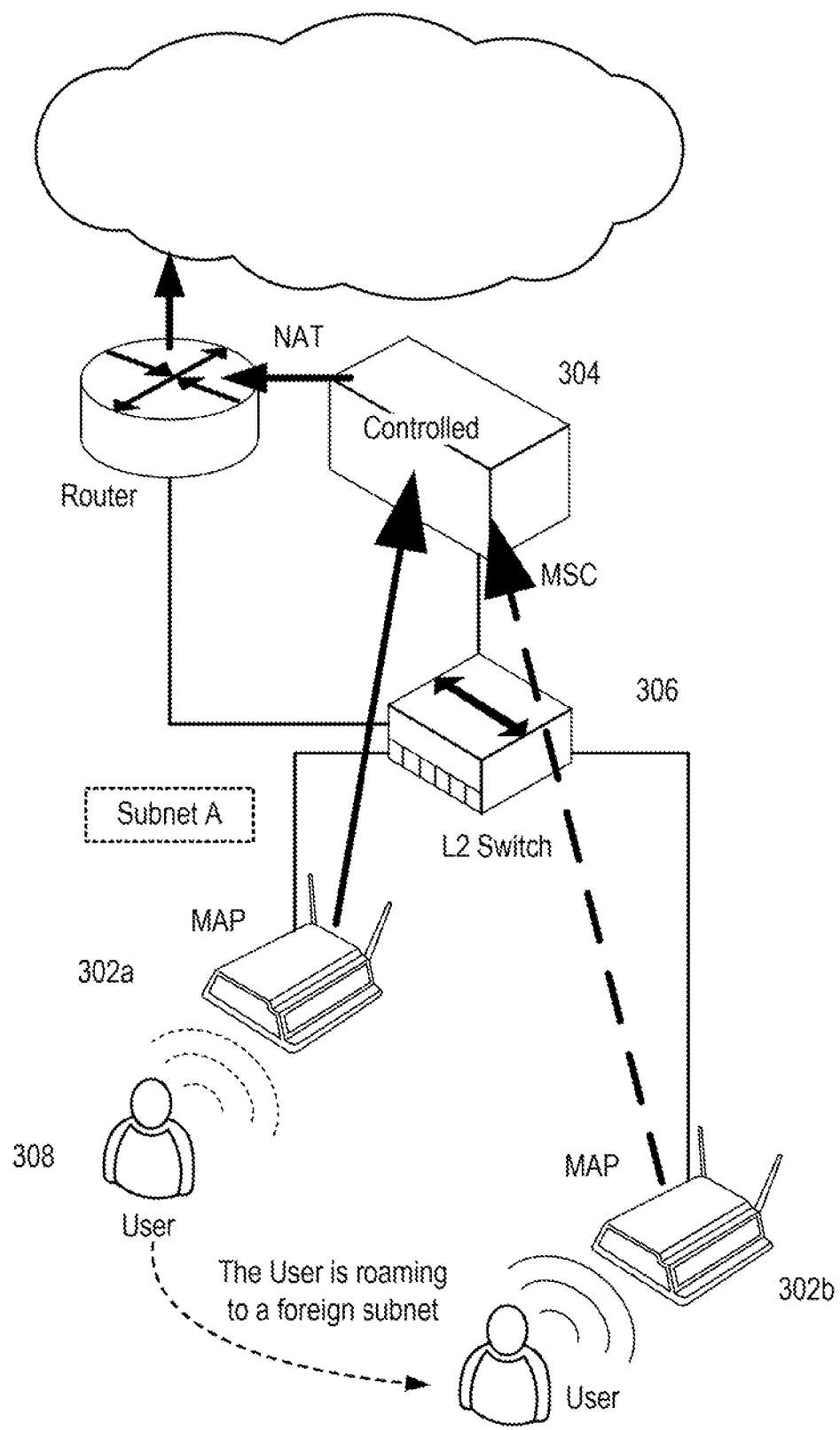
Figure 4:
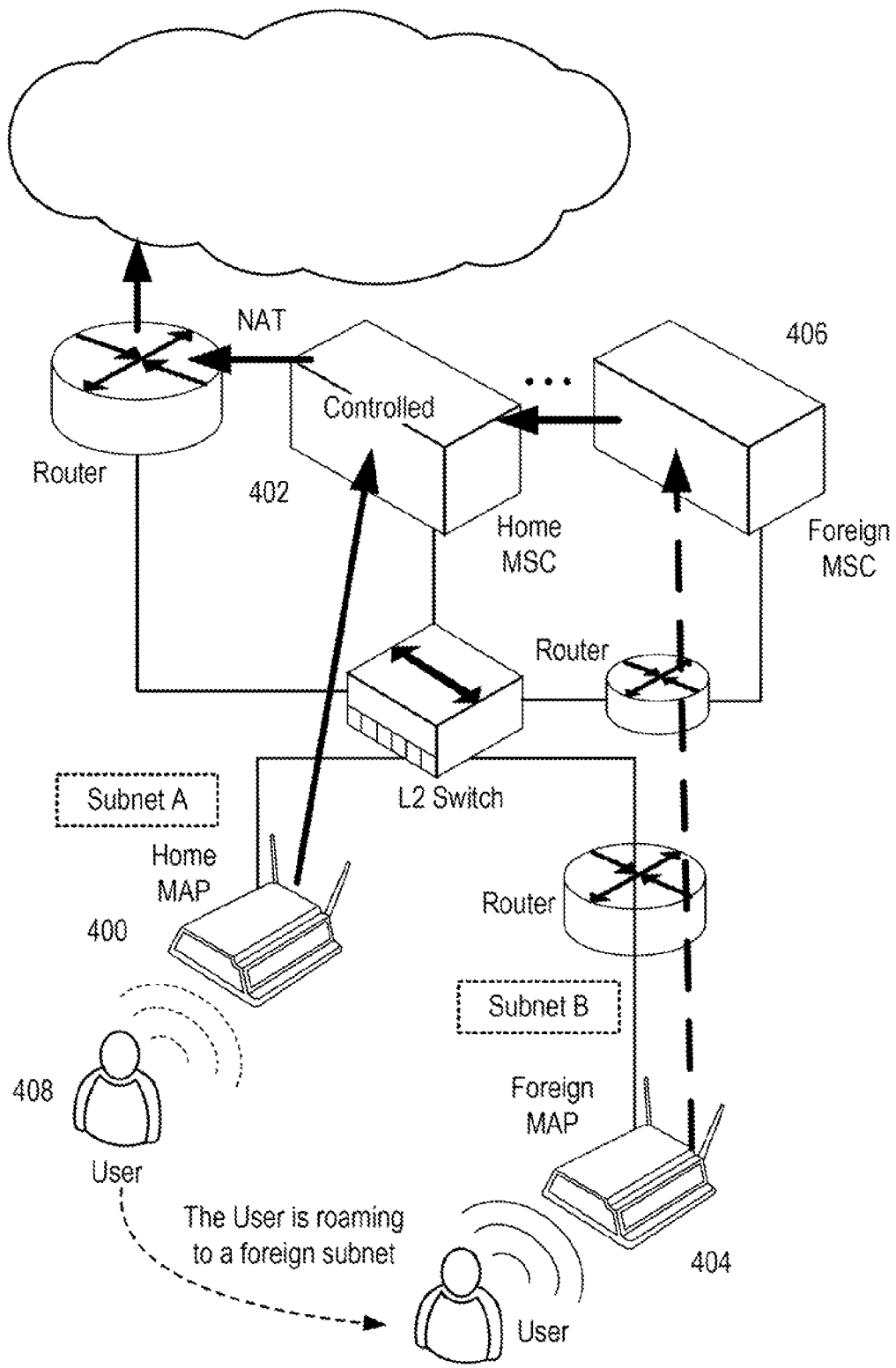
FIG. 4 illustrates a wireless topology in which the present invention may be implemented.

In a representative embodiment, such as seen in FIG. 4, wireless infrastructure topology comprises a set of access points that are managed by at least first and second service controllers. A representative service controller is a MultiService Controller (MSC) available from Colubris Networks, Inc. of Waltham, Mass., although this is not a limitation of the invention. Any WLAN service controller or equivalent device may be used. A given service controller manages a large number of (e.g., up to 1000) access points, and the services controllers can be connected to one another through routers and switches to form a large topology. Of course, the number of access points and controllers will depend on the physical constraints of the facilities in which the infrastructure is implemented. The Wi-Fi infrastructure may include or have associated therewith a server that performs RADIUS-compliant AAA services. The service controller may be implemented in any convenient manner, such as a personal computer, a server, or similar machine. A representative service controller is a rack-mounted PC running a Linux 2.4 (or equivalent) operating system kernel on a Pentium (or equivalent) processor, and the device includes system memory and external storage for supporting software applications and associated data. The SC also includes standard network interfaces (Ethernet ports) to facilitate the functions described below. The controller typically exports a web-based (or equivalent) interface for administration, management and monitoring.

A representative access point (AP) includes various software modules executing on a hardware and software platform, and suitable networking support. It must include at least one or more radios to facilitate the wireless connectivity. In a two radio configuration, a first radio typically is configured to be IEEE 802.11b+g compliant and the second radio is configured to be IEEE 802.11a compliant. Alternatively, the radio may comprise multiple radio modules each of which being a/b/g compliant. A software-configurable dual-band radio structure of this type is merely illustrative, as it allows users with different hardware requirements to connect to the device simultaneously and to share the AP resources. The access point typically comprises a WLAN port and one or more LAN ports. A "virtual" access point (VAP) is a logical entity that exists within a physical access point. A representative access point is a MultiService Access Point (MAP) available from Colubris Networks, Inc., although any AP or equivalent device may be used. Typically, a bridge is an L2 switching device implemented in hardware, in firmware, or in software. The infrastructure may include additional devices, e.g., AAA server, a VoIP PBX, an IP router that connects to the public Internet, and the like.

Figure 5:
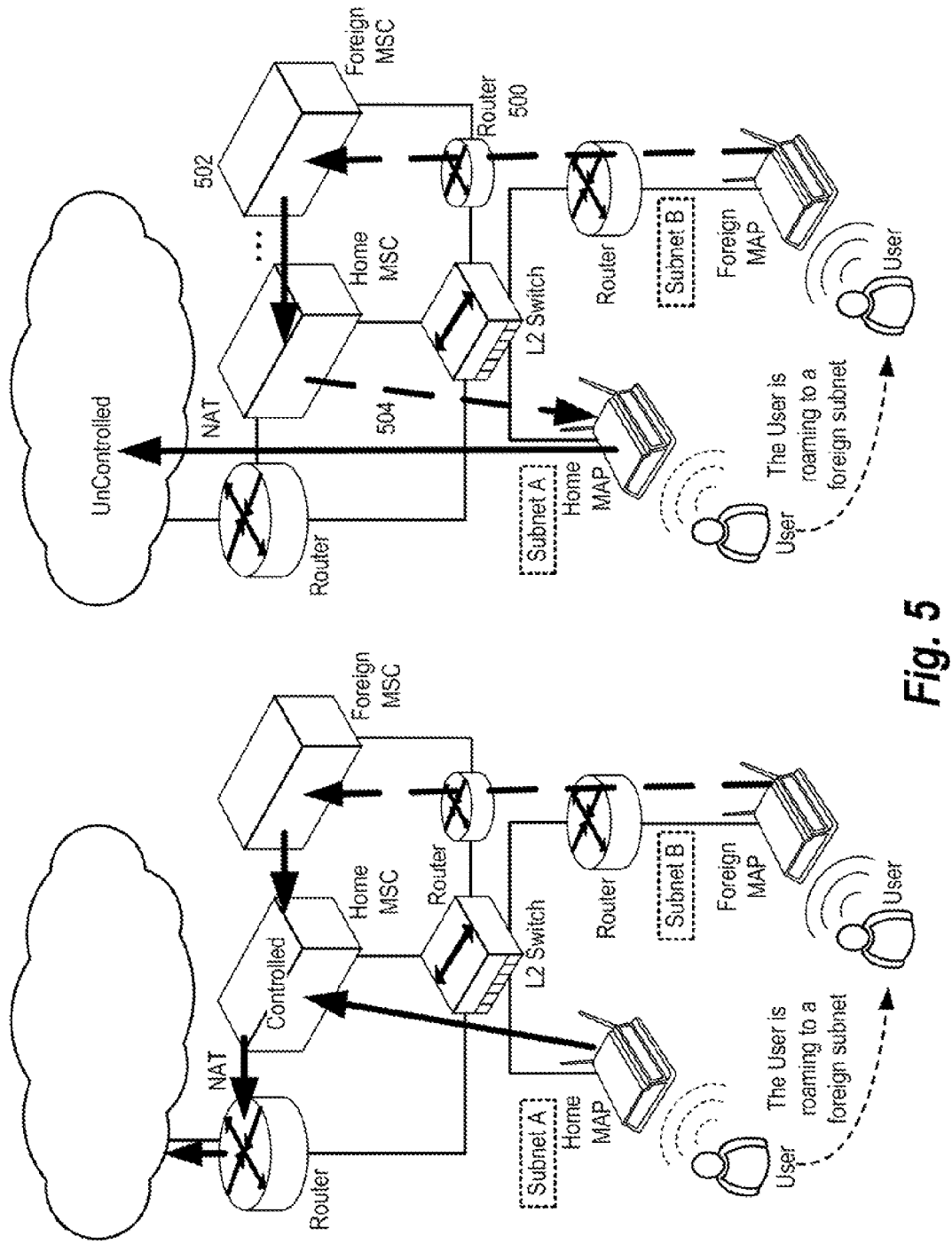
FIG. 5 illustrates how a set of GRE tunnels are used to facilitate fast roaming according to one aspect of the invention.

By way of additional background, and with continued reference to FIG. 4, it is useful to consider the roaming problem from the point of view of the bridge. In particular, when a user connects to a specific subnet using a VAP, from the bridge's viewpoint the user falls back into two different categories. In particular, either the VAP is access-controlled and all the traffic is forwarded to the master SC to be received under the bridge interface, or the VAP is not access-controlled and the traffic is delivered directly onto the local subnet to be taken care of by the subnet network elements. For third party access points or wired users, the problem remains the same. Depending on the network configuration, all traffic is redirected to the service controller for access control, or it is directly placed onto the network to optimize the data path for the user traffic. Because the VAPs at an AP could be access-controlled or not depending on the AP and network configuration, three topologies must be supported in the context of a distributed architecture: namely, a single SC per subnet, with each SC managing the entire set of APs in its local subnet; multiple SCs inside the same subnet, with each SC managing its own subset of the subnet APs; or, a single SC managing multiple subnets, with the SC managing all APs within the different subnets. FIG. 5 illustrates the different possibilities in a single diagram in terms of VAP requirements and topologies. Although it may not be a typical network deployment, the roaming case depicted in FIG. 5 covers all aspects of the functionality that, as will be seen, is supported by the present invention. The case where only a single SC manages all devices can be derived from the drawing where the multiple SCs are merged inside a single element; in such case, the communication between the SCs disappears and internal processing occurs.

According to the present invention, as the user roams to the foreign subnet, the packet flow is forwarded to the foreign SC device prior to redirection to the home subnet network elements. Depending on the VAP type (access controlled or not), the traffic may or may not be handled locally at the home SC. According to the invention, preferably a tunneling mechanism is supported to bypass routers between the APs and the SCs. As will be seen, this configuration provides full L3 mobility as the user roams across the topology. Preferably, the tunneling mechanism is a set of tunnels that conform to the Generic Routing Encapsulation (GRE) specification. Information concerning GRE can be found, for example, in RFC 2784, *Generic Routing Encapsulation (GRE)*, by D. Farinaccio, T. Li, S. Hanks, D. Meyer, P. Traina, Network Working Group. In particular, according to the present invention, the basic idea for L3 mobility is to use GRE tunnels to encapsulate user traffic at the L2 level and put the traffic back on the same physical switch port as if the client was attached to an AP in its home subnet. In a representative embodiment, and with reference to FIG. 5, this is achieved by pre-establishing and maintaining three (3) GRE tunnels: a first GRE tunnel 500 from foreignMAP to foreignMSC, a second GRE tunnel 502 from foreignMSC to homeMSC, and a third GRE tunnel 504 from homeMSC to homeMAP. Thus, preferably a given AP always tunnels the traffic not belonging to its own subnet to its controlling SC. As will be described in more detail below, preferably the foreignMSC uses the source MAC address in a L2 header of a de-encapsulated GRE packet to find out the homeMSC for the roaming client. The homeMSC further tunnels the packets via GRE to the homeMAP, which may or may not be in the same subnet as the homeMSC unless the homeMSC has direct L2 connectivity to the home subnet.

Although GRE tunnels are preferred, this is not a limitation. Other techniques, such as L2TP, Ether-IP, and the like, may be used.

As depicted in FIG. 5, when a user roams from his original location to a foreign subnet, the foreign AP is the first device that detects the roaming. This detection is necessary for the AP to decide whether to handle the user locally or to force the user traffic to follow a dedicated path to the subnet master SC for further action. According to the invention, the determination that a user has roamed to a foreign subnet (so that an appropriate forwarding decision can be made based on that knowledge) occurs in the bridge; it is based upon receiving a first L3 packet from the user and, in response, adjusting the bridge forwarding table such that all traffic from the client's associated source MAC address shall be forwarded to the service controller (or other network element) for further action. The following provides further details on the necessary bridge enhancements to support L3 user roaming at the AP.

Figure 6:
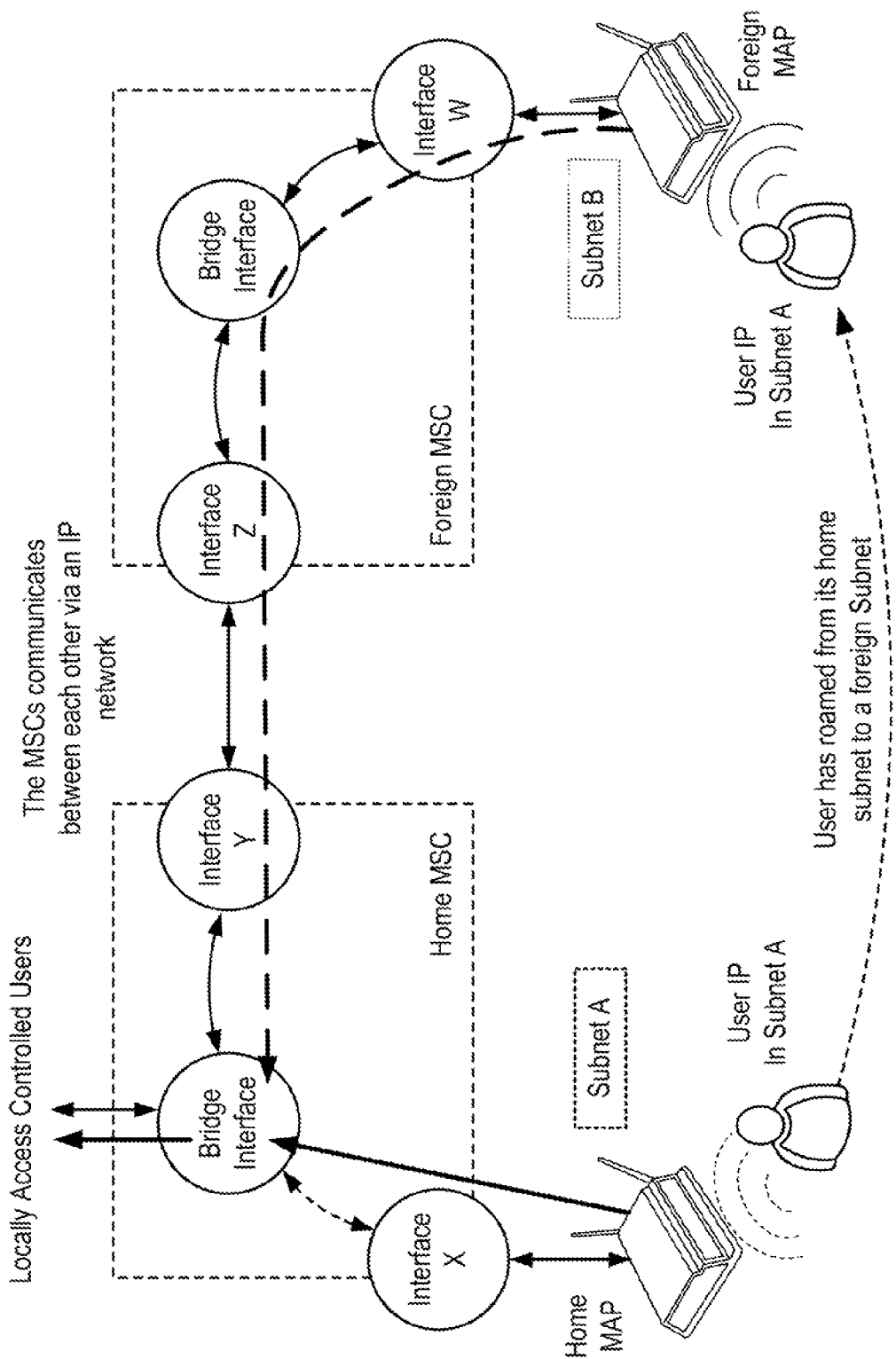
FIG. 6 depicts an access-controlled and access-uncontrolled user roaming case.
Figure 7:
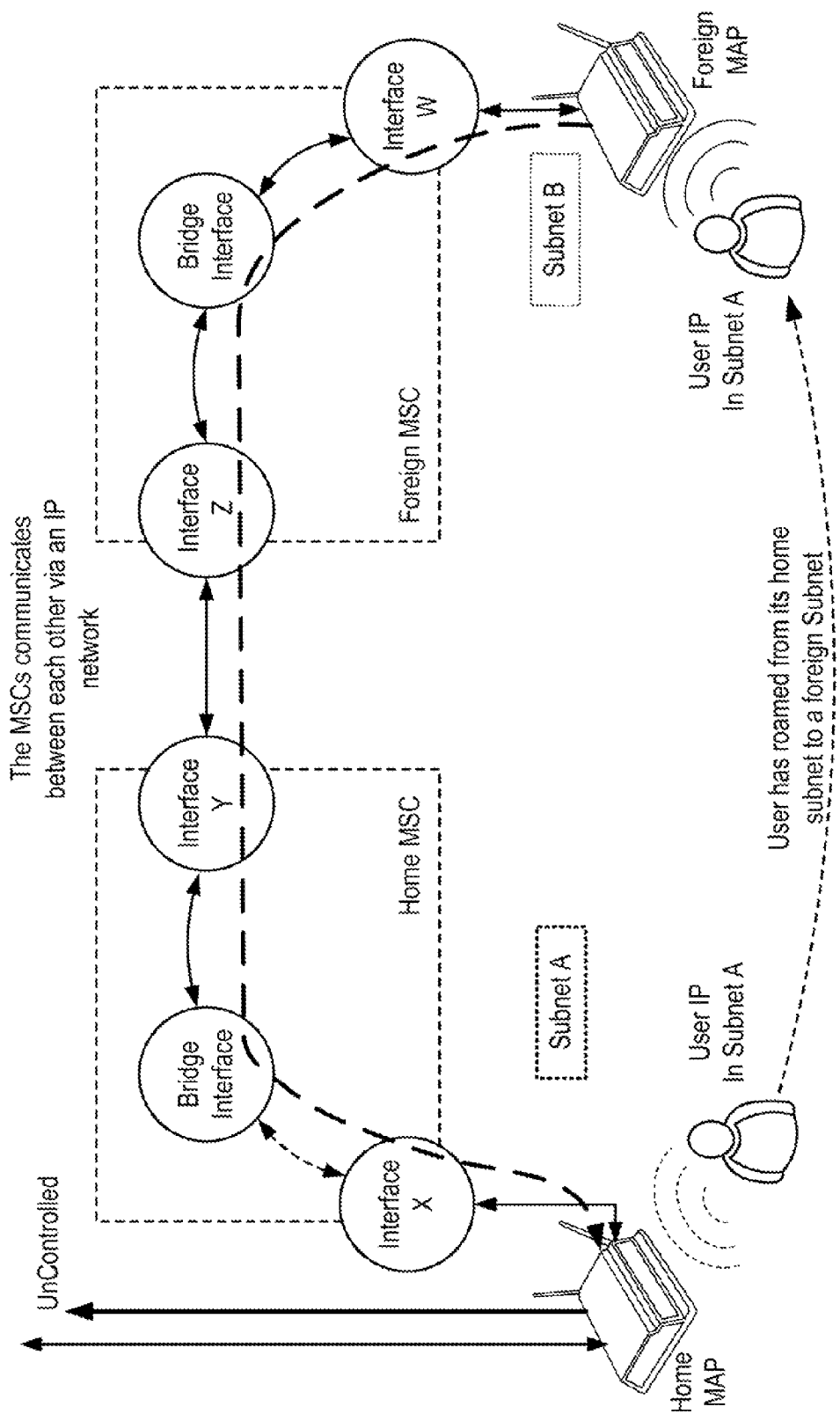
FIG. 7 depicts an access-uncontrolled user roaming case.

Because all roaming traffic is forwarded by the AP to the central SC and aggregated under the bridge to be processed at L2 level, the user traffic must be forwarded back to the home subnet for L3 connectivity reasons. FIGS. 6 and 7 illustrate two possible scenarios. In particular, the diagrams depict the access-controlled and access-uncontrolled user roaming case from the different bridge interfaces at the home and foreign SC. The communication that takes place between the SC devices may or may not be done using the same external interface as the incoming roaming user traffic. In the topology where a single SC is handling its own local subnet, the communication between the devices is done using the Internet port, although the user traffic is coming from the LAN port.

FIG. 7 illustrates the need for the bridge to be able to force the forwarding of roaming user traffic on a specific interface that may be different than the one from where the traffic has been received. In such case, the bridge needs to differentiate a roaming user from a regular user at the foreign SC and to determine whether or not a user is access controlled at the home SC. This knowledge enables the bridge to take appropriate actions upon reception of user traffic at the different forwarding steps of the system. Thus, regardless of the location of the bridge interface in the system (at the AP or at the SC), it is first necessary to address how to detect a roaming user within the different bridge interfaces that compose the system. This knowledge is necessary so that appropriate forwarding decisions can be made. The second issue is how to force the forwarding of roaming user traffic to a specific interface. This second issue raises the desirability of a forwarding mechanism different from the actual bridge implementation. The present invention addresses these issues.

In particular, as previously described, user roaming detection is necessary to decide whether to handle a user locally or to forward the user to the appropriate network element. According to the present invention, devices are able to detect L3 roaming users and to take the appropriate forwarding actions by virtue of L3 knowledge that is introduced inside the bridge. Although it is desired that the bridge should retain its L2 nature, using the present invention the L3 knowledge is introduced into the bridge in a non-intrusive way. The L3 knowledge facilitates a bridge learning process when a new user from a foreign subnet is seen for the first time inside the bridge tables. Basically, the L3 knowledge populates a bridge forwarding database during a learning phase and is used to forward the first packet of a roaming user. Once a first packet has passed through the different network elements, the bridge tables are updated accordingly and L2 forwarding is used thereafter. By matching the user L3 source address with local subnet L3 attributes on which the AP is located, the bridge is able to make the decision whether to forward the packet (e.g., using appropriate VAP settings, whether controlled or uncontrolled), or to declare the user as roaming and to force the traffic to reach the subnet master SC and ultimately the home SC. With L3 knowledge inside the bridge, the bridge is able to take its own decision and to handle roaming users as a standalone entity. The user is never blocked at the foreign subnet, as the bridge can always find a default path to send the traffic back to the home subnet. Preferably, the traffic is forwarded back to the home SC that takes the decision to control it or to forward it back to the home AP if the SC does not have direct L2 connectivity to the home subnet.

The following describes the bridge enhancements to facilitate the present invention. In particular, the detection of a roaming user inside the bridge based on L3 knowledge is detailed, as is a new forwarding mechanism that integrates source address and destination address forwarding. Specific cases for broadcast and other special packets are detailed later.

For an efficient detection of user roaming from a different subnet inside the bridge, L3 knowledge is introduced inside the bridge. The implementation described here preferably involves the creation of a separate database that contains subnet information and associated forwarding interface. A representative view of the L3 knowledge database is shown in FIG. 8. As can be seen, a L3 subnet is specified by a pair of information, with the information being based on a L3 address and a subnet mask. This information is determined during a device discovery phase, e.g., by a management entity or process. The bridge is informed of this data and the internal database populated. If the position of the devices (APs and SCs) in the network changes, a reconfiguration event is triggered and a new discovery phase takes place that reconfigures the appropriate information inside the bridge L3 knowledge database. It is also assumed that the subnet information does not overlap. (If this is not the case, preferably the first entry found in the database that matches the subnet is used). The database is referred to during the bridge learning phase when an entry is not found is the bridge forwarding database. Although the L3 knowledge is similar in term of information handled at the AP and at the SC, the interpretation of the information is different. The following sections detail a new bridge learning algorithm at the AP and SC bridges.

Typically, the AP has only a view of its own master SC. During the discovery phase, the AP device acquires knowledge of the interface (it could be a tunnel) that must be used to reach the SC as well as local L3 subnet information. Thus, at the AP the L3 knowledge database is populated preferably with a single entry that describes the local subnet, and points to the SC where the AP has been registered. If multiple VLAN interfaces (each having its own IP address and an associated subnet), are defined at the AP, then the AP will have an entry in the L3 knowledge database for each unique subnet to which it has connectivity through a VLAN interface. At the AP, the database entry is interpreted when a new incomer is detected by the bridge learning mechanism; in particular, all traffic that is not part of the configured subnet is forwarded to the specified SRC (source) interface. The database at the preferably is filled with the necessary information about how to reach every service controller in the network. This implementation assumes that a discovery phase takes place between all the SC devices in the network and that management exchanges are used as necessary to propagate knowledge of all subnets and their associated master SC. This discovery process is described below. A management entity propagates this information inside the SC bridge tables. At the SC, the database entries are interpreted when a new incomer is detected by the bridge learning mechanism; in particular, all traffic that is part of the database entry subnet is forwarded to the specified SRC interface.

In a centralized architecture, there may be no management entities that are able to configure the L3 knowledge database. Thus, the bridges at the AP (and at the access controller) have no L3 knowledge (i.e., the database is empty), and such devices fall back into the same learning algorithm as before. This default mechanism preferably is also implemented inside the bridge learning mechanism. In particular, when no valid L3 entry is found, the processing falls back into a regular L2 bridge case.

A new bridge learning algorithm is now described. The algorithm handles all cases mentioned above. Typically, there will be a need to distinguish whether the processing is done at the AP or at the SC due to the difference in the database entry interpretation. As noted above, this knowledge is configured by a management entity when populating the database entries. This knowledge also can be retrieved dynamically from the SC as it is discovered by the AP.

To generalize the handling of entries at the different network elements (whether SC or AP), the bridge L3 knowledge database is enhanced with an attribute that indicates the appropriate behavior to take when matching a database entry. This database organization is depicted in FIG. 9. When populating a database entry, an attribute is passed along with the subnet and interface information. Further details on the mechanism used to communicate the information to the bridge are set forth below. In this database organization, a "positive" matching means that all traffic that matches the subnet attributes is to be forwarded to the SRC interface. A "negative" matching means that all traffic that does not match the subnet attributes is to be forwarded to the SRC interface. At the AP, preferably the database is populated with a single "negative" entry, and the subnet attributes match the AP local subnet. At the SC, the database is populated with many "positive" entries that correspond to the subnet attributes of the SC neighbors. At the end of a database, a "negative" entry may be appended to force all the remaining traffic to go through a specific interface. In the typical case, it is not expected for a negative entry to be present in the SC L3 knowledge database.

An existing bridge learning algorithm is modified to include the L3 knowledge database processing, such as indicated below:

---

If the L2 source MAC address is not inside the Bridge forwarding database
Then
    If the L3 source address matches an entry inside the L3 knowledge
    database
    Then
        Add a new entry to the Bridge forwarding database with the
        regular parameter in the addition to the SRC interface
        found in the L3 knowledge database entry.
    Else
        Add a new entry to the Bridge forwarding database with the
        regular parameters.
    End If
Else
    Update the entry with the regular parameters.
End If

---

If no entry matches in the database, as noted above, preferably the regular learning processing is performed based on the L2 MAC address. A known bridge behavior resets the authorization attribute when a new entry is added or modified in the forwarding database. Accordingly, when learning an entry from the L3 knowledge process, the authorization attribute shall always be set to "Yes" in the database. This ensures that the traffic from the roaming station flows in the forwarding phase. If this operation is not performed, the roaming station traffic may be blocked at the foreign SC device, which is a situation that should be avoided to guarantee fast roaming as much as possible.

It is desired to provide system calls to any high level process that may want to configure the bridge L3 knowledge database. Accordingly, an application programming interface (API) may be provided for addition/modification and removal of a specific entry inside the database.

In addition to the bridge learning process, extra parameters need to be present in the bridge forwarding database. As will be seen, this new information is used preferably in conjunction with the traffic source address in the forwarding phase to facilitate fast user roaming. A new forwarding database organization is now described. As will be seen, this new organization regroups attributes already present inside the current bridge database in addition to the source (SRC) interface that is used in the source address forwarding mechanism. FIG. 10 illustrates this new bridge forwarding database. The SRC interface is internally determined by the bridge. Information may or may not be present for a specific entry because for local users, the local subnet does not have to be forced to a specific interface based on source address. Rather, a regular forwarding mechanism (based on the destination MAC address) takes place. This consideration is further described in the following section where the forwarding algorithm is elaborated.

A new forwarding algorithm is defined in the bridge where a source address takes precedence over a destination address. By ensuring that L3 knowledge acquisition occurs during the bridge learning phase, the forwarding decision still is just based on the user traffic MAC address. The following is a representative bridge forwarding algorithm.

```
If the L2 source MAC address is inside the Bridge forwarding database
Then
    If an SRC interface is present in the database entry
    Then
        Forward the packet to that SRC interface.
    End If
End If
If the L2 destination MAC address is inside the Bridge forwarding
database
Then
    Forward the packet to the DST interface.
Else
    Flood the interfaces with the packet (default case, also used for
    broadcast packets).
End If
```

As can be seen, this algorithm does not break or conflict with prior art bridge functionality (i.e., where no L3 knowledge is present). In particular, when no L3 information is configured inside the bridge, the learning phase devolves into a default bridge behavior. This is also the case in the forwarding phase where no SRC interface information is present in the database entries. In particular, the forwarding ends up using the known destination MAC address processing.

The above-described design may be generalized to any interface in the system. In particular, preferably the functionality does not depend on the technology used to carry the traffic to the SC. There are many ways to force user traffic to reach the subnet SC device depending on the network topology being used between the AP and the SC. Thus, at the L2 level, a VLAN interface could be used as a simple tunneling mechanism to guarantee a dedicated path between the APs and the SC. At the SC, a VLAN range interface could then be used to aggregate all AP traffic into a single interface.

At the L3 level, however, a L2/L3 tunneling mechanism should be used to bypass L3 active network elements. In particular, in an illustrative embodiment, a GRE interface is made available to the bridge in the system. To aggregate a broader range of tunnels under the main bridge, as well as to facilitate the tunnel configuration and to avoid wasting resources at the SC, a generic GRE interface is also supported. In the case where aggregation interfaces are present under the bridge (VLAN Range or unnumbered GREs), interface name information is not sufficient for forwarding traffic to a specific network. Thus, it is necessary to have an extra parameter next to the interface name that identifies more precisely the internal network to be used inside the aggregation interface engine. To this end, the attribute already used to handle VLAN ID when a VLAN Range is used as a destination interface is renamed to generalize the concept to any aggregation interface. It is required to have an ID stored by the bridge during the learning phase preferably with a significance only known by the aggregation interface itself. During the forwarding phase, this ID is delivered back to the interface for interpretation. The same consideration preferably applies to the newly added source interface. In this scheme, it is possible for traffic to come and go through aggregation interfaces. This is particularly useful at the SC where all APs are aggregated into a single tunneling interface and all the SCs are aggregated under a single tunneling interface (probably on a different port).

FIG. 11 represents a preferred version of the bridge forwarding database. The L3 knowledge database is preferably upgraded to support the SRC interface ID information necessary to populate the forwarding database entry during the learning phase. FIG. 12 represents a preferred version of the L3 knowledge database. As can be seen, the L3 knowledge table is built differently on an AP as compared to an SC. On the AP, the L3 knowledge table comprises the list of all L3 subnets on which wireless clients shall be considered local. These entries are set as negative matches for convenience, and they are considered managed by the AP. On the SC, the L3 knowledge table comprises two (2) types of entries, all of them preferably set as positive matches: the concatenation of all L3 subnets managed by all APs connected to this SC (these entries are considered managed by the this SC); and the concatenation of all L3 subnets managed by all SCs connected to this SC. In both cases, a Home Interface is set to the interface to which the traffic from a matching L3 source shall be forwarded. A configuration API may be used to add or modify information in the L3 knowledge database as previously described.

Figure 13:
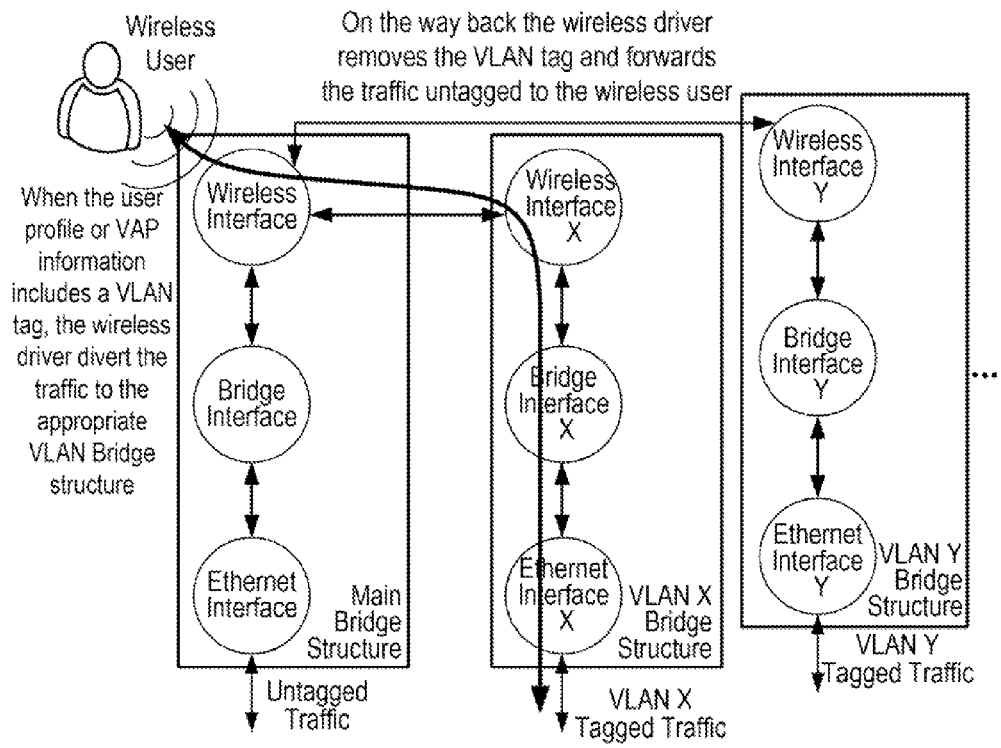
FIG. 13 depicts a representative bridge structure at the AP involving VLAN interfaces.

The system and database information described above apply in a context where a single bridge manages all the aggregation interfaces. Thus, it fits in the SC architecture, as well as in the AP architecture when no VLANs are used in the VAPs. The AP considerations, however, become slightly different, especially when VLAN interfaces are present. In this case, preferably multiple bridge interfaces are created within the AP device, and there is no forwarding possible between them. FIG. 13 depicts a typical bridge structure at the AP involving VLAN interfaces. Although there are many other interfaces and combinations that could be under the bridge structures, the diagram describes a regular case where user traffic is received from a wireless interface and directed to an Ethernet port. The user traffic is segmented into VLANs. In the AP, the regular wireless interface and driver always receive the traffic from the user untagged. Based on the VAP knowledge or user profile parameters, the wireless driver is able to inject the packet tagged with a specific VLAN ID in the appropriate bridge structure.

The above-described architecture has been designed to guarantee a segmentation of untagged and tagged user traffic as well as to guarantee a clear segmentation between the VLAN interfaces that are usually assigned to different subnets. This translates into an issue when a single GRE interface is used to communicate between the AP and the SC. For the design to function properly, the GRE interface shall be hooked under a bridge. Due to the multiple bridge interfaces when VLAN interfaces are used and the mix of user traffic, it could be difficult to determine which one shall handle the GRE interface. When placed under the main bridge, it could be difficult to forward GRE encapsulated roaming user traffic tagged between the AP and the SC. When placed under a VLAN bridge structure, it could be difficult to forward GRE encapsulated untagged traffic as well as VLAN tagged traffic other than the VLAN ID assigned to the structure. As described above, it is desirable to have the GRE interface handled under a unique bridge. Thus, it may not be possible at the AP to support a mix of untagged and tagged traffic for the same GRE tunnel. One alternative to address this issue is to create as many GREs interfaces as there are bridge structures in the AP.

In a networked environment, many different packet types may go through the bridge. In particular, unsolicited packets, unicasts or broadcasts may reach the bridge. The design described above assumes that the traffic is coming from the roaming user is a regular unicast L3 traffic encapsulated in a L2 frame. The following section addresses packet types outside the scope of typical L3 traffic.

An ARP is a special packet in a sense that it is a L2 packet that includes L3 information. When a roaming user sends an ARP request, it must be forwarded to its home subnet. When the home subnet receives an ARP response for that user, it must be forwarded to the foreign subnet. An ARP request is an L2 broadcast packet, however, it contains L3 information inside that belongs to the roaming user. If the regular L2 broadcasting algorithm inside the bridge is used to process these packets, it may have an adverse effect (as the local network could answer to the ARP). If an L2 entry in the forwarding database is present for the source MAC address (even though the destination is a broadcast address), preferably the ARP request is processed as described above and reaches the home subnet naturally. This implies that an entry is present in the database at all time which supposes that an L3 packet has already been sent by the roaming user inside the system. Unfortunately, this is not always the case. An ARP request usually comes before any L3 packet in the network. Thus, it may be desirable to introduce a special case in the bridge learning mechanism to inspect the ARP requests if an L2 entry is not found for the source MAC address. The processing extracts the source L3 address information from the packet and matches it against the L3 knowledge database. If the L3 address information matches an entry in the database, the ARP request is forced to the appropriate interface to reach the home subnet. An updated version of the learning algorithm is provided below to provide this functionality.

An ARP response usually comes after an ARP request. As the ARP request is processed throughout all the network elements and associated bridges, it finds its way to the roaming user foreign subnet. If the ARP request was sent inside the home subnet prior to the roaming of the user, it is unlikely to reach the foreign subnet, as the bridge tables would not be updated. The occurrences of this case are limited. In any event, it is assumed that a retry would be performed from the foreign subnet by the roaming user. In this case, preferably the bridge tables are updated and the subsequent ARP response is forwarded to the foreign subnet.

DHCP packets are supported inside a regular UDP frame which translates into a regular L3 packet encapsulated into an L2 frame. Some DHCP requests, however, may have significance from a roaming user prospect. In particular, when a roaming user sends out a DHCP discover, it means that the user wants to break all connection to a home subnet so that connectivity can be handled by a foreign subnet (which subsequently becomes a new home subnet). Although the IP source address in the packet is 0.0.0.0, the bridge algorithm detects this situation and, in response, the source forwarding information is cleared from the database before devolving to the regular L2 forwarding mechanism. A DHCP request is a special packet that may be either a unicast or a broadcast at L3 level. When a roaming user sends out a DHCP request with its own IP, it is processed inside its home subnet. This is because if a source IP is present it means that the user challenges the IP for renewal. The server that knows about the request address is located in the home subnet. A particularity of the DHCP request is that the IP source address field may be 0.0.0.0. This is typically the case when a user has sent a discovery request and does not have an address assigned yet. As in the DHCP Discover case above, the entry attributes are reset and, as no IP information is available, the user falls back to the default case where the source address L2 algorithm is used to forward the request to the local subnet.

When handling broadcast packets, the bridge usually floods the interfaces with a duplicate of the packet. When aggregation interfaces are used, the expected behavior is that packets are duplicated on all the tunnel interfaces inside the aggregation interface. When a roaming user sends a broadcast inside a foreign network, however, preferably the source forwarding algorithm takes precedence over the L2 destination; thus, instead of being duplicated and sent to all interfaces in the bridge, the broadcast traffic is redirected to the specific SRC interface. This is the behavior expected as the broadcast traffic of the roaming user should reach the home subnet before being processed and flooded inside the bridge.

The following provides an update of both bridge learning and forwarding algorithms based on the considerations mentioned in the paragraphs above. This is a preferred bridge learning algorithm:

---

If the L2 source MAC address is not inside the Bridge forwarding database
Then
    If the packet is an ARP request
    Then
        Extract the L3 source address from the packet.
    End If
    If the L3 source address matches an entry inside the L3 knowledge
    database
    Then
        Add a new entry to the Bridge forwarding database with the
        regular parameter in the addition to the SRC interface and
        SRC interface ID found in the L3 knowledge database entry.
    Else
        Add a new entry to the Bridge forwarding database with the
        regular parameters.
    End If
Else
    If the packet is a DHCP Discovery
    Then
        Clear the SRC interface and the SRC interface ID
        information from the entry.
    End If
    Update the entry with the regular parameters.
End If

---

This is a preferred bridge forwarding algorithm:

---

If the L2 source MAC address is inside the Bridge forwarding database
Then
    If an SRC interface is present in the database entry
    Then
        Forward the packet to that SRC interface.
    End If
End If
If the L2 destination MAC address is inside the Bridge forwarding
database
Then
    Forward the packet to the DST interface.
Else
    Flood the interfaces with the packet (default case, also used for
    broadcast packets).
End If

---

The following provides additional details regarding the establishment and maintenance of GRE tunnels among the various devices in the system. As noted above, preferably these tunnels are pre-established and available when the user roams across the network.

The following network topologies are possible when the MSC and MAP are used in tandem within a network to support L3 mobility.

One MSC Per Subnet

This is the simplest case where there is an MSC on each subnet. In this case, there is direct L2 connectivity between MSC and the MAP, and it is possible for the homeMSC to support L3 roaming directly without involving the homeMAP in GRE tunneling. However, to guarantee that the wireless client continues to "receive" all the multicast traffic that it was receiving while it was in the home subnet, it is important to tunnel all traffic received at the homeMAP to the homeMSC. This is because the physical switch port connecting the homeMAP to the switch would still receive all the multicast traffic as it was receiving before the client roamed. Reception of multicast traffic at the homeMSC's switch port otherwise might not be guaranteed. Also, to support a consistent design for all network topologies mentioned below, preferably a GRE tunnel is established between the homeMSC and the homeMAP.

One MSC for Multiple Subnets

This is the case where there is a router between the MAP(s)s and their controlling MSC. L3 roaming in such a case mandates that there is a GRE tunnel from the controlling MSC to MAP, because it is the MAP that has the capability to put the L2 packet on the home subnet. It should be noted that the foreignMSC could be the same as the homeMSC when an MSC is supporting multiple subnets. In this case, there is no need to tunnel the packets within the MSC itself; rather, the packet is just put into the homeMAP tunnel.

Multiple MSCs for One Subnet

This is the case when the number of MAPs in a subnet is so large that a single MSC may not be able to handle them. Each MAP is expected to have one (and only one) GRE tunnel to its controlling MSC. This scenario may be used to provide some level of redundancy in the system.

Multiple MSCs for Multiple Subnets

This case is covered by combining the above sections.

A service controller discovery protocol daemon (scdpd) is used to collect information about the service controllers. For discussion purposes, a service controller preferably is a multi-service type; for convenience, this type of SC is referred to as an MSC. According to this daemon, all MSCs convey their EP address to a designated Primary MSC, which in-turn propagates information to all known MSCs. Typically, the Primary MSC is configured in each MSC by a network administrator. To support L3 mobility as previously described, subnet information (network mask) along with an IP address also is sent during the discovery process. In particular, preferably each MSC sends IP addresses and subnet masks for all APs that it controls.

Preferably, the GRE tunnels are established from within the discovery process. In particular, it is assumed that the service controller discovery protocol daemon learns about all other MSCs and all MAPs controlled by it. GRE tunnels are shared by roaming as well as by AC functionality. Preferably, the service controller discovery protocol daemon can bring down a tunnel when a remote MSC/MAP goes down. If tunnels are created or deleted in a different process, then the dynamically discovered information should be passed to those other processes.

Preferably, a service controller discovery database (scdb) stores the following additional fields for each client device:

HomeMAP: the last AP visited by a client while it was in its home segment; this field also should be added to a Wireless Client Database;

IP Address: this field is added to the Wireless Client Database;

Subnet mask: this field is added to an AccessPoint Database, Wireless Client Database and a Service Controller Database;

VLAN ID: This field is added to the Wireless Client Database;

HomeMSC: The MSC controlling the homeMAP; an IAPP daemon can populate this field when adding a wireless client record;

ForeignMAP: the AP in a foreign subnet that a client is visiting when roaming.

IAPP

An IAPP daemon supports the messaging required for L3 roaming. The IAPP daemon gets event notifications about client associations, it sends PMK cache information to the MSC (so that it may be propagated to other MSC and other MAPs, and the same mechanism is extended to distribute IP address, subnet mask, VAP-ID and VLAN-ID of the wireless clients), and it is integrated with a TLS tunneling mechanism. The client database on the MAP is shared by L2 roaming and L3 roaming, and the IAPP daemon informs the MSC about client associations and disassociations. On a client association, IAPP sends at least the client's MAC address, IP address (if available), VAP ID and VLAN-ID. It may also send other fields as required to support fast L2 roaming. A disassociation may occur due to time-out or system shutdown.

IAPP Messaging

It is assumed the network elements can communicate with another by exchanging IAPP messages, typically through a secure (e.g., TLS) tunnel. Network elements may communicate control information using non-secure tunnels or, if appropriate, no tunneling.

The IAPP daemon on the MAP sends an IAPP.ADD message to the IAPP daemon on the MSC whenever a new association happens at any MAP. It also send another IAPP.ADD message as soon the IP address of client can be found deterministically, i.e. when a first IP packet has been seen from the client.

The following sequence of steps takes place within IAPP. When the MSC gets an IAPP.ADD request that has the IP address of the client, it performs a lookup of the sending MAP's subnet. If the client belongs to the same subnet as the MAP sending the IAPP.ADD message, then the client is at home. If, however, the client does not belong to the same subnet as the MAP sending the IAPP.ADD request, the MSC searches its subnet table to find an MSC that can serve the clients's subnet. If multiple MSCs can serve the client's subnet, then the MSC selects (as the homeMSC) the MSC with a lower numerical IP address, and updates the same in the database. When the client is in its home subnet, all of the 3 fields (currentMAP, lastVisitedMAP and homeMAP) are the same. The field homeMSC has the IP address of the MSC controlling the homeMAP. As it moves within its home subnet the fields, currentMAP, HomeMAP and LastVisitedMAP are updated. HomeMSC field may be updated, if the controlling MSC has changed (this could happen in the case of multiple MSCs per subnet). As the client moves to a foreign subnet, the field homeMAP is not updated, and that MAP serves as the homeMAP for that roaming client. As the client roams within the foreign subnet, the lastVisitedMAP field is updated, but the homeMAP field is left intact.

The client's IP address and subnet mask are part of the cached information (along with the PMKs) about clients in each relevant MAP. According to the invention, this information facilitates the determination of whether a client originates from a foreign subnet, even prior to seeing any IP traffic from the client, after it moves to the MAP. IAPP also cleans up the client from the wireless association table on receiving IAPP.MOVE message, or (as described below) a MSC2MAPDeleteVisitor message, or a MSC2MAPDeleteTravelerNotice.

Setting VLAN ID in Wireless Driver from Cached Information

A VLAN ID field is fetched from the wireless driver and also saved in the database. This field is used when it is received as part of a RADIUS attribute, and the VLAN-ID that was assigned to the user as part of the RADIUS authentication continues to be used. IEEE 802.1p priority may also have been assigned using this field. This field is automatically taken care of when the VLAN-ID field is set because the 802.1p priority is part of the 16-bit value. Moreover, because the 802.1x authentication process is bypassed when fast authentication takes place at the L2 level, care should be taken to set the VLAN-ID in the wireless driver. This can be done by the IAPP daemon.

Layer 2 Update Frame

A L2 update frame is required to be sent out so that any L2 devices, e.g. bridges, switches and other MAPs, can update their forwarding tables with the correct port to reach the new location of the wireless client station.

Who should Send this Frame?

Preferably, the L2 update frame is sent out by the IAPP daemon on the MAP when it gets the notification of a new client association.

When to Send this Frame?

This frame should only be sent for a client that is in its home subnet, because sending this frame from a foreignMAP could trigger proxy ARP (e.g., from "intelligent" L2 switches). IAPP decides whether or not to send this update frame right away by looking at the cached client database. The cached client database should have the IP address and subnet mask for the client. If the client is at home, then the update frame is sent; otherwise, it is not sent. In the event the client cannot be found in the cached client database, the L2 update frame is sent after the client's IP address can be determined (either after the MAP has seen the "$1^{st}$ IP packet" from the client, or a DHCP Request from the client). This frame is also sent out by a MAP on receiving a MSC2MAPAddTravelerNotice message as described in more detail below.

First IP Seen Wireless Driver Event

This event is sent from the wireless driver to the IAPP daemon. The event notification contains the MAC address of the client and its IP address. This event is only sent for wireless clients associating to a VSC that has L3 mobility enabled. On receiving this event, the IAPP daemon updates the MSC database with the IP address of the client. The IP information can then be used for proactive tunneling.

GRE Tunnels

In one embodiment, it is recommended that three (3) tunnels be used to send traffic from a roamed client back to its home segment, namely, a first tunnel from the foreign AP to its associated SC, a second tunnel from the SC to the client's home SC, and a third tunnel from the home SC to the home AP. As noted above, using GRE tunnels to encapsulate traffic from a roaming L3 client ensures that all the nodes in a network have consistent ARP tables. Moreover, using GRE tunnels ensures that all multicast traffic is sent from a roamed client back to its home segment and from a client's home segment to it. As previously described, it is desirable to send L2 packets on the roamed client's home segment. In so doing, each client on the home segment has the correct MAC address of the roaming client at all times. This also ensures that the roaming client at all times has the real MAC addresses of all nodes in its home segment.

Sending multicast/broadcast traffic through a GRE tunnel may impose processing burdens on the MAP. Thus, it may be desired to limit the amount of multicast/broadcast traffic that goes through the tunnel. One optimization is to only send multicast (not broadcast) traffic received at the MAP's switch port through the tunnel. Broadcast traffic will be received at the MSC port as long as the MSC and MAP are on the same subnet.

When the home service controller has L2 connectivity with one or more of its managed L3 subnets, it is preferable to forward packets from/to the roaming device directly without using the roamer's home access point. Accordingly, several tables need to be set on the home service controller: a first table in which the matching L3 subnet entry should have its home IP set to the Ethernet interface having L2 connectivity to this L3 subnet; and a second table that will have a vdb entry set for each wireless client having the potential to roam to a different subnet.

The first tunnel is required so that the L2 switch between the foreign AP and the foreign SC does not start doing proxy ARP for the roaming clients. The second tunnel is required to get the packets from the foreign subnet to the home subnet (in case of one MSC per subnet) or its home MAP (in case of one MSC for multiple subnets), to maintain connectivity when the foreign SC does not have direct L2 or the VLAN connectivity to the roaming client's home subnet, and to maintain L2 priority information in the packets generated by the client. The third tunnel is required when there is a router between the SC and the AP. It may be possible to avoid having a GRE tunnel between the homeMAP and the homeMSC, i.e., when both the homeMAP and the homeMSC are in the same subnet. Without the third tunnel, however, there still may be issues with multicast traffic because the switch port connecting the homeMSC might not receive all multicast packets even though it is in promiscuous mode, e.g., because the switch never forwards them to the MSC's switch port. Unless the switch sees an "IGMP Join" coming out from the MSC's switch port, it may not forward multicast traffic to that port. Note that most switches have a feature called as "IGMP snooping" (enabled by default in most cases), that monitors a "IGMP Join Request" received at various switch ports. Based on these requests, the switch decides which ports should receive the multicast packets to be forwarded. In any case, a GRE tunnel between the MSC and MAP is required when the home MAP and the home MAP's controlling MSC (i.e. homeMSC) are not in the same subnet, i.e., when there is a router between the home AP and its MSC. There are advantages of having a direct tunnel between the foreignMAP and the homeMAP. One advantage is that the roaming delay is less because the packet only needs to be encapsulated once at the foreignMAP and then de-capsulated once at the homeMAP. A second advantage is that this approach takes the MSC completely out of the data plane, which makes the solution highly scalable. It is possible to theoretically support a large number of MAPs per MSC. This becomes possible because the only traffic passing through the service controller is control and management traffic; preferably, there is no data traffic traversing the MSC.

GRE, like VLAN, is treated as a bridge interface. The bridge still needs to be updated to handle the forwarding of packets to GRE tunnels. As noted above, preferably this forwarding is based on a source MAC address, not the traditional destination MAC address used by bridges. To this end, and as described, a new field is created in the bridge forwarding table that contains the tunneling interface to be used for traffic. On the foreign AP, the foreign SC and the home SC, this field is populated as traffic from roaming users is processed to set up the appropriate destination tunnel. On the home AP or home SC (if it has direct L2 connectivity to the home subnet), no tunnel is set up in the forwarding table, and the packet is forwarded as normal (e.g., based on destination MAC address).

Initializing GRE

The GRE interface and associated driver preferably are loaded by turning on the GRE function in a configuration setting. The driver is loaded and initialized and added to the bridge interface during initialization.

Creating GRE Tunnels

The tunnel between a MAP and its discovered MSC is established as part of the discovery process. When an MSC and a MAP establish communication, preferably the tunnel is established from both sides and is available for traffic prior to having to tunnel any traffic from a foreign subnet. Creating the tunnel between an MAP and its MSC upon discovery avoids any overhead/latency in establishing the tunnel when it comes time to forward the traffic. Likewise, the tunnel between MSCs is also preferably created as part of the MSC discovery process. When an MSC detects the presence of another MSC, the tunnel is established from both sides and is available for traffic prior to having to tunnel any traffic between subnets. Preferably, tunnel IP addresses are the br0 IP addresses of either the AP or the MSC.

The following describes representative GRE packet flow.

GRE Packet Flow

Packet Flow—Foreign AP Receives Packet from Roaming Client

Figure 14:
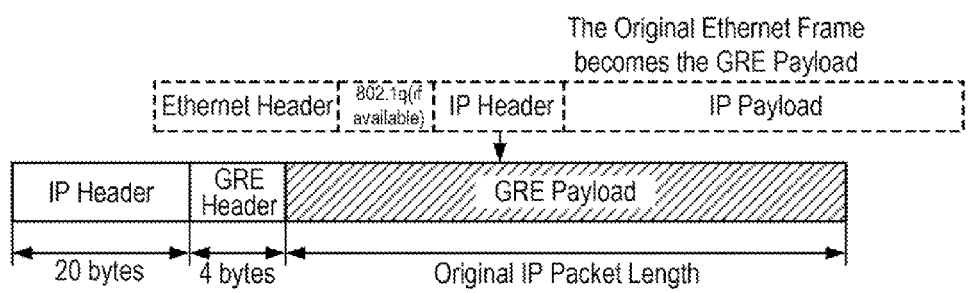
FIG. 14 illustrates a GRE encapsulation technique used to facilitate a GRE tunnel.

1. Packet is received over the wireless interface (ieee80211_input)
2. Packet is passed to Network interface receive routine (netif_rx)
3. Packet is forwarded to the bridge for processing (br_forward_frame)
4. The bridge makes the forwarding decision about whether a packet needs to be sent over the GRE tunnel. This decision is based on the source address of a packet. The first packet received from a roaming client on the foreign MAP establishes that wireless client as a visitor. When this happens, the tunnel designator from the AP to the foreign MSC is set up in the bridge. Any packets from this source address are forwarded to the GRE tunnel interface set up in the forwarding table.
5. The bridge sets the destination device to the tunnel specified in the forwarding table.
6. A device transmit routine is invoked, which ultimately calls the transmit interface in a GRE driver.
7. The GRE driver takes the full Ethernet packet, adds the GRE header, and adds an IP header to the packet. The IP header contains the source and destination IP addresses of the tunnel endpoints (MAP and MSC), and the packet type is set to IP. See, e.g., FIG. 14. Any L2 or L3 Quality of Service (Qos) markings in the tunneled packet are replicated on the outside of the encapsulating header to ensure intermediate LAN switches and routers can enforce and preserve end-to-end QoS.
8. The GRE driver determines the route (destination device) of the EP packet based on the source and destination IP address, and calls the device transmit routine.
9. A bridge output routine receives the packet, which now contains the MSC as the destination. The packet is forwarded to the Ethernet driver for physical transmission.

Packet Flow—Foreign MSC Receives Packet from Foreign AP (Over GRE Tunnel)

1. The Ethernet driver receives the packet from the physical interface.
2. The Network interface receive routine Netif_rx passes the frame to the bridge (br_process_frame)
3. As the destination is local (the MSC), the frame is not bridged, and the bridge passes the frame back to netif_rx.
4. Netif_rx determines the client associated with the packet type (IP).
5. An IP input routine is invoked to process the IP packet.
6. The IP input routine determines the client associated with the JP protocol within the IP packet.
7. A GRE receive routine is invoked with the received packet.
8. The GRE driver receive routine de-encapsulates the packet, validating and stripping the GRE Header.
9. The de-encapsulated packet (Ethernet frame) is passed back to the Network interface receive routine (netif_rx)
10. Netif_rx passes the frame to the bridge, br_forward_frame. The Ethernet frame is now the original, with original source/destination, sent by the roaming client.
11. The bridge makes the forwarding decision about whether a packet needs to be sent over the GRE tunnel. This decision is based on the source address of a packet. When the roam of a user originating from a different home subnet is detected, the foreign MSC is notified of the roam by the foreign MAP, and the foreign MSC sets up the forwarding tunnel in the forwarding database. This tunnel corresponds to the tunnel between the Foreign MSC and the Home MSC. Any packets from the roaming client are forwarded to the GRE tunnel interface set up in the forwarding table.
12. The bridge sets the destination device to the tunnel specified in the forwarding table.
13. A device transmit routine is invoked, which ultimately calls the transmit interface in the GRE driver.
14. The GRE driver takes the full Ethernet packet, adds the GRE header, and adds an IP header to the packet. The IP header contains the source and destination IP addresses of the tunnel endpoints (Foreign MSC and Home MSC), and the packet type is set to IP. Any L2 or L3 Quality of Service (QoS) markings in the tunneled packet are replicated on the outside of the encapsulating header to ensure intermediate LAN switches and routers can enforce and preserve end-to-end QoS.
15. The GRE driver determines the route (destination device) of the IP packet based on the source and destination IP address, and calls the device transmit routine.
16. The bridge output routine receives the packet, which now contains the Home MSC as the destination. The packet is forwarded to the Ethernet driver for physical transmission.

Packet Flow—Home MSC Receives Packet from Foreign MSC (Over GRE Tunnel)

1. The Ethernet driver receives the packet from the physical interface.
2. Netif_rx passes the frame to the bridge (br_process_frame)
3. As the destination is local (the MSC), the frame is not bridged, and the bridge passes the frame back to netif_rx.
4. A Network receive input routine determines the client associated with the packet type (IP)
5. An IP input routine is invoked to process the IP packet.
6. The IP input routine determines the client associated with the IP protocol within the IP packet.
7. The GRE receive routine is invoked with the received packet.
8. The GRE driver receive routine de-encapsulates the packet, validating and stripping the GRE Header.
9. The de-encapsulated packet (Ethernet frame) is passed back to the Network Interface routine (netif_rx).
10. Netif_rx passes the frame to the bridge, br_forward_frame. The Ethernet frame is now the original, with original source/destination, sent by the roaming client.
11. The bridge makes the forwarding decision about whether a packet needs to be sent over the GRE tunnel.

This decision is based on the source address of a packet. When the roam was detected, the Home MSC was notified of the roam, and the Home MSC set up the forwarding tunnel in the forwarding database. This tunnel corresponds to the tunnel between the Home MSC and the Home MAP. Any packets from the roaming client are forwarded to the GRE tunnel interface set up in the forwarding table. This tunnel is only used if the Home MSC does not have direct L2 connectivity to the home subnet; otherwise, the packet is forwarded to the destination by the MSC.

12. The bridge sets the destination device to the tunnel specified in the forwarding table.
13. A device transmit routine is invoked, which ultimately calls the transmit interface in the GRE driver.
14. The GRE driver takes the full Ethernet packet, adds the GRE header, and adds an IP header to the packet. The IP header contains the source and destination IP addresses of the tunnel endpoints (Home MSC and Home MAP), and the packet type is set to IP. Any L2 or L3 Quality of Service (Qos) markings in the tunneled packet are replicated on the outside of the encapsulating header to ensure intermediate LAN switches and routers can enforce and preserve end-to-end QoS.
15. The GRE driver determines the route (destination device) of the IP packet based on the source and destination IP address, and calls the device transmit routine.
16. The bridge output routine receives the packet, which now contains the Home MAP as the destination. The packet is forwarded to the Ethernet driver for physical transmission.

Packet Flow—Home Map Receives Packet from Home MSC (Over GRE Tunnel)

1. The Ethernet driver receives the packet from the physical interface.
2. Netif_rx passes the frame to the bridge (br_process_frame)
3. As the destination is local (theMAP), the frame is not bridged, and the bridge passes the frame back to netif_rx.
4. The Network receive input routine determines the client associated with the packet type (IP)
5. An IP input routine is invoked to process the IP packet.
6. The IP input routine determines the client associated with the IP protocol within the IP packet.
7. The GRE receive routine is invoked with the received packet.
8. The GRE driver receive routine de-encapsulates the packet, validating and stripping the GRE header.
9. The de-encapsulated packet (Ethernet frame) is passed back to the Network interface receive routine (netif_rx).
10. Netif_rx passes the frame to the bridge, br_forward_frame. The Ethernet frame is now the original, with original source/destination, sent by the roaming client.
11. The bridge makes the forwarding decision about whether a packet needs to be sent over the GRE tunnel. This decision is based on the source address of a packet. On the Home MAP, no tunnel is designated for the source address. The packet is forwarded to the destination associated with the destination device, which is either the Ethernet or wireless interface.

Starting/Stopping Traveler Traffic Forwarding

When a roaming client roams over to a foreign subnet, the homeMAP and homeMSC need to start the tunneling of traffic. Similarly, when the client comes back home, the homeMAP and the homeMSC need to stop tunneling traffic for the client. This is achieved by sending messages among MSCs and MAPs.

VSC ID

The information about a client's VSC is available within the bridge table. The same data should be filled in the Key field of the GRE header. This information is needed at the foreign MAP to decide the VSCs to which it sends the broadcast packets.

Access Control Information

The MAP must also add the information about whether the VSC from which the packet originated is access-controlled or not. This helps differentiate packets from a MAP that has a roaming client on one VSC and access-controlled client on another VSC. The information also can be used for access control purposes. For example, one could use a 1-bit flag to specify access-controlled VSC or non-access-controlled VSC. This is because AC feature will use the same GRE tunnel.

QoS Information

The QoS information needs to be passed along in the GRE header. This is because certain clients may generate traffic from the same source MAC address with varying priorities. Hence, the L2 priority of each packet needs to be passed on inside the GRE header itself.

Maintaining L2 and L3 Priorities

It is important to maintain the L2 and L3 priorities when traffic is encapsulated and sent back to the homeMAP. Hence, the L2 priority from the original packet generated by the roaming client preferably is preserved in the outer header of the encapsulated GRE packet. The same also applies to the L3 priority. Preferably, the TOS byte is copied into the header of the encapsulated packet as it exists in the original IP packet. This is done before computing the IP header checksum to avoid re-computation of the checksum after the TOS byte has been copied. In other words, the L3 header of the GRE packet contains the same L3 (TOS) priority settings as what is found in the encapsulated payload. Should the encapsulated payload not be based on IP (could be NetBUI, IPX or something else), the L3 priority should match what is defined at the L2 level. In one embodiment, a static mapping between the L2 and L3 priority may be defined for such a case (i.e. non-IP traffic).

MSC and MAP Interaction

The MSC and the MAPs may use information from the MSC database. The IAPP daemon may update the MSC database at the time of every client association, and all message exchanges preferably happen through the IAPP daemon on the MSC and the MAP. The MSC and MAP exchange various control messages to start/stop tunneling of traffic for a roaming client. All these messages preferably are exchanged via a secure TLS connection that already exists from the MAP to the MSC. An existing TLS API shall be used to establish another TLS connection from every MSC to every other known MSC. The sections below list the various types of messages that may be exchanged between the MAP and the MSC.

Messages from MSC to MSC

MSC2MSCAddTravelerNotice

This message is sent from a foreignMSC to the homeMSC. It contains:
 a. Traveler's MAC address,
 b. Traveler's IP address, On receiving this message, the receiving (home) MSC searches a wireless client table and tries to find out the homeMAP for the client. If the homeMAP cannot be found, the homeMSC designates one of the MAPs in the same subnet as the traveler as the homeMAP. If it is not possible to find such a MAP, then an error message is returned to the sending MSC. The homeMSC then sends a MSC2MSCDeleteVisitorNotice to the last known foreignMSC, if the Traveler MAC address can be found in its Traveler list. If the traveler is not found in the Traveler list, then there is no need to send MSC2MSCDeleteVisitorNotice. The homeMSC sends a MSC2MSCDeleteTravelerNotice to all known MSCs in the same subnet as the receiving MSC itself (this covers the case when there are multiple MSCs within the same subnet). If there is no more than the receiving MSC itself in that subnet (one MSC per subnet case), then the MSC2MSCDeleteTravelerNotice need not be sent to any other MSC. The homeMSC sends a MSC2MAPAddTravelerNotice to the homeMAP.

MSC2MSCDeleteTravelerNotice

This message is sent from one MSC to another MSC when both MSCs are in the same subnet, i.e. this message is only sent in the case of "multiple MSCs per subnet". The message contains the following information:
 a. Traveler's MAC address,
 b. Traveler's IP address
 c. Traveler's homeMAP On receiving this message, the receiving MSC tries to find out if any of the MAPs controlled by it is serving as the homeMAP for the TravellerMACAddress. If yes, then the receiving MSC sends a MSC2MAPDeleteTravelerNotice to that homeMAP. If none of the MAPs is serving as the homeMAP for the TravelerMACAddress, no further action needs to be taken.

MSC2MSCDeleteVisitorNotice

This notice is sent from a homeMSC to a foreignMSC. This message usually is sent when a roaming client roams while in a foreign subnet, or when it comes back home. This message shall contain the following fields:
 a. Visitor's MAC address,
 b. Visitor's IF address On receiving this message, the receiving MSC remove the VisitorMACAddress from its list of visitors, and sends a MSC2MAPDeleteVisitorNotice to a MAP that was tunneling traffic from that client so that the receiving MAP may clean up its visitor's database and perform necessary tunnel rules cleanup.

Messages from MSC to MAP

MSC2MAPAddTravelerNotice

This message is sent from MSC to the homeMAP. It contains the following information:
 a. Traveler's MAC address,
 b. Traveler's IP address On receiving this message, the receiving MAP starts sending all multicast, broadcast and "unicast traffic destined to the TravelerMACAddress received on its LAN port" through the GRE tunnel to its MSC.

MSC2MAPDeleteTravelerNotice

This message is sent from an MSC to MAP. It contains the following fields:
 a. Traveler's MAC address,
 b. Traveler's IP address On receiving this message, the receiving MAP stops tunneling traffic destined to the "unicast traffic destined to the TravelerMACAddress" through the GRE tunnel. It also stops tunneling the multicast, broadcast traffic through the GRE tunnel if it does not have any more L3 roaming client.

MSC2MAPDeleteVisitorNotice

This message is sent from an MSC to MAP. It contains the following fields:
 a. Visitor's MAC address,
 b. Visitor's IP address This message is sent by a foreignMSC to a MAP when a client roams within a foreign subnet. On receiving this message, the receiving MAP shall clear the visitor MAC address from its wireless client table, and from the visitor list.

Messages from MAP to MSC

The following messages are mentioned for sake of completeness. It might be possible to just use the existing IAPP messages as it is, or enhance the same to achieve the same purpose as described here.

MAP2MSCAddVisitorNotice

This message is sent from MAP to the MSC when the (foreign) MAP sees a L3 roaming client. It contains the following information
 a. Visitor's MAC address,
 b. Visitor's IP address On receiving this message, the MSC finds the homeMSC for the client by searching its subnet table, and sends a MSC2MSCAddTravelerNotice to that MSC.

MAP2MSCDeleteTravelerNotice

This message is sent from a MAP to its controlling MSC. The message contains the following information:
 a. Traveler's MAC address,
 b. Traveler's LP address On every new client association, the IAPP daemon gets notified and checks to see if the client is in its home subnet. If it is in the home subnet, the daemon sends this message to its controlling MSC, preferably via a TLS tunnel. The MAP with which a client associates might not be able to determine if the client just came back to its home subnet or whether the client is associating in the home subnet for the first time. This message is sent in any event.

On receiving this message, the receiving MSC sends MSC2MSCDeleteTravelerNotice to all known MSCs in the same subnet as the receiving MSC itself (this covers the case when there are multiple MSCs within the same subnet and the client roamed back home to a different MAP that is controlled by an MSC other than the one receiving the MAP2MSCDeleteTravelerNotice message. If there is no more than the receiving MSC itself in that subnet (one MSC per subnet case), then the MSC2MSCDeleteTravelerNotice message need not be sent to any other MSC.

Roaming Scenarios

The sections that follow describe various roaming scenarios, and how the message exchange takes place between the MSCs and the MAPs involved in roaming.

The following is the most basic roaming case. In this case, a client must be able to continue its session as it roams from its home subnet to a foreign subnet. The following steps support this scenario:
  1. When the foreignMAP gets the association, it looks up its "Neighbor Client's Cache" table to find if the client's MAC address exists. If yes, then the MAP uses the IP address and subnet information from this table to find if it is a L3 roaming client or not.
  2. If the newly associated client is a L3 roaming client as per information in the cache, then the foreignMAP sends a MAP2MSCAddVisitorNotice message to its MSC.
  3. If the newly associated client's MAC address cannot be found in the "Neighbor Client's Cache", then the MAP monitors traffic originating from the client until it can see a "First IP packet".

4. In the event tunneling has already been started based on cached information, and "First IP packet" indicates a different source IP address, the existing tunneling is stopped. The actual GRE tunnel is not dropped, only tunneling traffic for the specific MAC address is stopped.
5. The MAP tries to find out if the client belongs to its own subnet or not based on "first IP packet." If not, the MAP sends a MAP2MSCAddVisitorNotice to its controlling MSC.
6. The foreignMAP sends all packets coming from the roaming client's MAC address via the pre-established GRE tunnel to its controlling MSC (i.e. foreignMSC)
7. The foreignMSC (on receiving the MAP2MSCAddVisitorNotice message) looks up the wireless client database (using the MAC address as a key) to find the homeMSC for the visitor. If the wireless client cannot be found in the wireless client database, the foreignMSC consults its subnet table to find which MSC (s) might have a MAP that can serve the roaming client's subnet.
8. In the event multiple MSCs can serve the roaming client's subnet, the foreignMSC selects the MSC with the lowest numerical IP address as the homeMSC for that client.
9. The foreignMSC then sends a MSC2MSCAddTravelerNotice to the homeMSC using the secure management tunnel to that MSC.
10. The homeMSC (on receiving the MSC2MSCAddTravelerNotice) sends a MSC2MAPAddTravelerNotice message to the homeMAP.
11. The homeMSC then starts tunneling all traffic received from the GRE tunnel to the homeMAP unless the MSC has direct L2 connectivity to the home subnet.
12. The homeMAP (on receiving the MSC2MAPAddTravellerNotice message) starts tunneling all multicast, broadcast and all traffic destined to the Traveler's MAC address through the GRE tunnel (to the homeMSC).
13. The homeMAP or homeMSC sends a L2 update frame with the source MAC address set to the address of the roaming station to make sure that intermediate L2 switches can update their forwarding tables.

Roaming from Foreign Subnet to Home Subnet

When a roaming client roams back home, it may either roam back to:
a. The same MAP from which it roamed over;
b. A different MAP but within the same MSC;
c. A different MAP controlled by a different MSC (multiple MSC per subnet case).

Roaming Back to the Same Home Map

This is the simple case where the roaming client returns back to the same homeMAP from where it roamed over. The following sequence of steps preferably takes place:
1. The homeMAP sends a MAP2MSCDeleteTravelerNotice message to its controlling MSC, i.e., the homeMSC.
2. The homeMAP stops tunneling into the GRE tunnel the unicast traffic destined to the roaming client's MAC address.
3. If the homeMAP does not have any more roaming clients, it stops tunneling any multicast/broadcast traffic to its controlling MSC.
4. The homeMSC deletes the clients from its Traveler list.
5. The homeMSC sends a MSC2MSCDeleteVisitorNotice message to the last foreignMSC.
6. The foreignMSC sends a MSC2MAPDeleteVisitorNotice message to the foreignMAP.

Roaming Back to a Different Map within the Same MSC

When a client roams back to a different MAP than it roamed from, that MAP preferably takes the following actions:
1. The MAP sends a MAP2MSCDeleteTravelerNotice message to its controlling MSC, i.e., the homeMSC.
2. The homeMSC looks up its list of travelers and determines if the client just came back home, or whether this is a first time association of the client in its home subnet.
3. If the MAC address of the client is found in the Traveler's list, then the MSC sends a MSC2MAPDeleteTravelerNotice message to its homeMAP so that the homeMAP may clean up tunneling rules for that client.
4. The homeMSC sends a MSC2MSCDeleteVisitorNotice message to the foreignMSC.

Roaming Back to a Different Map Under Different MSC (Multiple MSCs Per Subnet Case)
1. The MAP sends a MAP2MSCDeleteTravelerNotice to its controlling MSC.
2. The MSC searches the wireless client database to locate the homeMSC for the client. It then sends a MSC2MSCDeleteTravellerNotice message to the homeMSC for the client.

Generic Procedure for all Three Cases Above
1. The MAP looks up its Traveler's list to see if the MAC address of the associating client is in the list.
2. If yes, then the MAP deletes the MAC address from the Traveler's list and stops tunneling unicast traffic for this client.
3. If the traveler's list is empty, the MAP stops tunneling multicast and broadcast traffic as well.
4. The MAP sends a MAP2MSCDeleteTravelerNotice message to its controlling MSC.
5. The MSC searches the wireless client database to locate the homeMAP for the client.
6. If the homeMAP cannot be found, then this client never roamed, and nothing else needs to be done.
7. If the homeMAP is found and is the same as the one sending the MAP2MSCDeleteTravelerNotice, then the MSC deletes the wireless client from its Traveler's list.
8. If the homeMAP is found and it is not the same as the MAP sending the MAP2MSCDeleteTravelerNotice, then the receiving MSC tries to find the homeMSC for that homeMAP.
9. If the homeMSC is the MSC itself, then the MSC sends a MSC2MAPDeleteTravelerNotice message to its homeMAP so that the homeMAP may clean up tunneling rules for that client. It is done at this point.
10. If the homeMSC is not the MSC itself, then the MSC sends a MSC2MSCDeleteTravelerNotice message to the homeMSC for the client, and it is done.
11. The homeMSC (on receiving the MSC2MSCDeleteTravelerNotice message) sends a MSC2MAPDeleteTravelerNotice message to the homeMAP.

Roaming within the Foreign Subnet

This case may be further sub-divided as follows:

Roaming to Another MAP within the Same MSC

In this case, preferably the following actions are taken:
1. The MAP sends a MAP2MSCAddVisitorNotice message to its controlling MSC, i.e., the foreignMSC.
2. The foreignMSC (on receiving this message) checks its Visitor list to see if it already has the MAC address of the roaming client in its database. If it does, then the foreignMSC sends a MSC2MAPDeleteVisitorNotice message to the old foreignMAP.
3. The old foreignMAP (on receiving the above message) removes the VisitorMACAddress from its Visitor's list (namely, its wireless association table) and cleans up the tunneling rules associated with that MAC address.
4. No further action needs to be taken on the foreignMSC.

Roaming to Another MAP Under a Different MSC

In this case, preferably the following actions are taken:
1. The MAP sends a MAP2MSCAddVisitorNotice message to its controlling MSC, i.e., the ForeignMSC.
2. The foreignMSC (on receiving this message) checks its Visitor list to see if it already has the MAC address of the roaming client in its database. If it does, then this case becomes similar to the case described in the previous section.
3. If the VisitorMACAddress cannot be found in the VisitorList, the MSC receiving the MAP2MSCAddVisitorNotice message searches the wireless client database to find the homeMSC for the client. (Note: At this point the foreignMSC could also use the subnet table to find out the homeMSC for the client, but subnet table searching involves longest prefix match and could take longer than a database lookup, which could be faster).
4. The MSC sends a MSC2MSCAddTravelerNotice message to the homeMSC.
5. The homeMSC searches its list of travelers, and if there was already a foreignMSC assigned for this MAC address, it sends a MSC2MSCDeleteVisitorNotice message to that MSC.
6. The MSC receiving the MSC2MSCDeleteVisitorNotice message sends a MSC2MAPDeleteVisitorNotice message to the MAP that has the client as a visitor.
7. If there were no previous foreignMSC assigned to TravellerMACAddress, then the homeMSC sends a MSC2MAPAddTravelerNotice message to the homeMAP.
8. On receiving the above message, the receiving MAP starts tunneling to its MSC (via the GRE tunnel) "unicast traffic destined to the roaming client's MAC address." It also starts sending the broadcast and multicast traffic if it were not already sending the same through the tunnel.

Roaming from One Foreign Subnet to Another Foreign Subnet

This case may be further sub-divided as follows:

Roaming to Another MAP within the Same MSC

In this case, preferably the following actions are taken:
1. The MAP sends a MAP2MSCAddVisitorNotice message to its controlling MSC, i.e., the foreignMSC.
2. The foreignMSC (on receiving this message) checks its Visitor list to see if it already has the MAC address of the roaming client in its database. If it does, then the new foreignMSC sends a MSC2MAPDeleteVisitorNotice to the old foreignMAP.
3. The old foreignMAP (on receiving the above message) removes the VisitorMACAddress from its Visitor's list and cleans up the tunneling rules associated with that MAC address.
4. If the foreignMSC cannot find the VisitorMACAddress in its Visitor's list, then this case becomes the same as mentioned in the next section.

Roaming to Another MAP Under a Different MSC

In this case, preferably the following actions are taken:
1. The MAP sends a MAP2MSCAddVisitorNotice message to its controlling MSC, i.e., foreignMSC.
2. The foreignMSC (on receiving this message) checks its Visitor list to see if it already has VisitorMACAddress in its VisitorList. If it does, then this case becomes similar to the case described in the previous section.
3. If the VisitorMACAddress cannot be found in the VisitorList, the MSC receiving the MAP2MSCAddVisitorNotice message searches the wireless client database to find the homeMSC for the client.
4. The MSC then sends a MSC2MSCAddTravelerNotice message to the homeMSC.
5. The homeMSC searches its list of travelers, and if there was already a foreignMSC assigned for this MAC address, the homeMSC sends a MSC2MSCDeleteVisitorNotice to that MSC.
6. The MSC receiving the MSC2MSCDeleteVisitorNotice message sends a MSC2MAPDeleteVisitorNotice message to the MAP that had the client as a visitor.
7. If there was no previous foreignMSC assigned to TravellerMACAddress, then the homeMSC sends a MSC2MAPAddTravelerNotice message to the homeMAP.
8. On receiving the above message, the receiving MAP starts tunneling to its MSC (via the GRE tunnel) "unicast traffic destined to the roaming client's MAC address." It starts sending the broadcast and multicast traffic if it was not already sending the same through the tunnel.

Roaming within the Home Subnet

This is L2 roam; no special handling is required.

Two Roaming Clients Pinging Each Other

In this case, preferably the traffic is not sent back to the home segment.

A and B Both Belong to the Same Subnet

Assume A and B are two roaming clients both belonging to the same home subnet. The following scenarios need to be carefully handled:

Both A and B are on the same MAP while roaming. In this case, A and B will hear each other's broadcasts automatically because they are on the same AP, and they should be able to communicate with one another using unicast.

A is on MAP $A_x$ and B is on MAP $B_x$. $A_x$ and $B_x$ are both controlled by the same $MSC_x$. In this case $MSC_x$, shall forward broadcasts received from $A_x$ on to all GRE tunnels that it has towards other MAPs that it is controlling that have a roaming client from the same subnet. $MSC_x$ shall also forward the broadcasts towards the homeMSC, that shall forward it to other MSCs which would further be responsible for sending it over other GRE tunnels to other MAPS that may have roaming clients from the same subnet.

A is on MAP $A_x$ and B is on MAP $B_y$. $A_x$ is controlled by $MSC_x$ and $B_y$ is controlled by $MSC_y$. In this case $MSC_x$ shall send forward broadcasts (unicast too) received from $A_x$ to the homeMSC for A. The homeMSC shall send these to $MSC_y$, which would eventually send these to $B_y$ and hence the client B.

A and B Belong to Different Subnets

Assume that A and B are two roaming clients both belonging to different subnets. The following scenarios need to be carefully handled:

Both A and B are on the same MAP while roaming. In this case, both A and B will each try to reach each other through their respective default gateways, and the communication should work fine. The default gateway's communication to the roamers is no different than a device in the roamer's respective subnet trying to talk to the roamer.

Even if A and B are on different MAPs within the same MSC, the communication takes place in the same way as described above.

Move Detection, Pro-Active IP Lookup and Tunnel Setup

A deterministic decision whether or not a client has performed a L3 roam is done after seeing the "First IP packet" from a client. In some cases, a roaming client may not "generate" an IP packet for quite some time after roaming. Thus, it may be desired that traffic tunneling is started pro-actively based on cached information, such as information received using IAPP. This can be done for clients that have an IP address in the database. The system can still keep monitoring for the first IP packet; if it matches the one in the database for a client's previous associations at a different MAP, then the processing continues. If it does not match, however, then packet tunneling may be stopped and the client's IP in the database updated.

Avoiding the $3^{rd}$ Tunnel (homeMSC to homeMAP) in Certain Cases

In the case when it is not possible to find the homeMAP for a roaming client (e.g., because the client never associated to a MAP in its home subnet, or the association timed out) then some MAP may be designated as the homeMAP. The routine then proceeds as if the client associated to that designated homeMAP. In the alternative, it may be desirable to designate a homeMAP, and let the homeMSC perform the task. This avoids the $3^{rd}$ tunnel between the homeMSC and the homeMAP.

IGMP Snooping

In the case when there is no router between an MSC and the MAP, it is possible to minimize the multicast traffic going though the GRE tunnel by implementing IGMP snooping on the MAP. The MAP then informs its MSC of any multicast groups it is joining, and the controlling MSC may join the same as well. As a result, the switch port connecting the MSC starts receiving the same multicast packets. The MAP then only needs to send those multicast frames to the MSC through the GRE tunnel for which an "IGMP Join Request" was never seen.

Configuration

In a normal operation mode, a network management system (NMS) may be used to configure MSCs and MAPs composing the network in a pre-configuration step. Once the network architecture is fully operational, user traffic may be able to flow in the network. In an alternative operation mode, the management system issues requests to configure a live device in the network. It is assumed in this case that impact on the user traffic is expected while the networks elements are reconfiguring.

While aspects of the present invention have been described in the context of a method or process, the present invention also relates to apparatus for performing the operations herein. As has been described above, this apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A given implementation of the present invention is software written in a given programming language that runs on a server on a standard Intel hardware platform running an operating system such as Linux.

While given components of the system have been described separately, one of ordinary skill will appreciate that some of the functions may be combined or shared in given instructions, program sequences, code portions, and the like.

Finally, while the above text describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Having described our invention, what we now claim is as follows.

The invention claimed is:

1. A network apparatus comprising:
a data storage to store a layer 2 (L2) bridge forwarding table; and
a processor to configure the L2 bridge forwarding table, wherein when a client is determined to be moving from a subnet associated with a first network element to a subnet associated with the network apparatus, evaluating a source Internet Protocol (IP) address within a Layer 3 (L3) header in a first frame to determine if the client is roaming, and when the client is determined to be roaming, the processor is to configure the L2 bridge forwarding table to include a source Medium Access Control (MAC) address of the client together with information identifying an interface for use in directing client data traffic back towards the subnet associated with the first network element,
wherein an encapsulation tunnel is associated with the first network element and the network apparatus prior to the client moving from the subnet associated with the first network.

2. The network apparatus of claim 1, wherein the processor is to direct the client data traffic in the first frame towards the subnet associated with the first network element via the interface associated with the source MAC address.

3. The network apparatus of claim 1, wherein the client data traffic is tunneled from the network apparatus to the first network element via the encapsulation tunnel.

4. The network apparatus of claim 3, wherein the encapsulation tunnel is a Generic Rounding Encapsulation (GRE) encapsulation tunnel.

5. The network apparatus of claim 1, wherein the network apparatus is a service controller.

6. The network apparatus of claim 1, wherein the network apparatus is a bridge.

7. The network apparatus of claim 1, wherein the L2 bridge forwarding table also includes information identifying at least a source interface for use in receiving data traffic returned towards the subnet associated with the network apparatus.

8. The network apparatus of claim 1, wherein IP address information of the client stored at the network apparatus is used to enable the client to receive inbound data, and the inbound data is one of a unicast, a multicast and a broadcast.

9. The network apparatus of claim 8, wherein receipt of the multicast or broadcast data is enabled via exchange of given messages between the first network element and the network apparatus, where the given messages are delivered over a secure tunnel, a non-secure tunnel, or without using a tunnel.

10. The network apparatus of claim 8, wherein the processor is to enable receipt of the unicast data by configuring the L2 bridge forwarding table.

11. The network apparatus of claim 1, wherein the inbound data is received at the client prior to transmission of the first frame by the client or the forwarding of the first frame after configuration of the L2 bridge forwarding table.

12. The network apparatus of claim 1, wherein the processor is to direct the client data traffic in any frame after the first frame towards the subnet associated with the first network element via the interface associated with the source MAC address.

13. The network apparatus of claim 1, wherein the client data traffic is associated with one of unicast traffic, multicast traffic, broadcast traffic, an ARP data packet, and a DHCP renew packet.

14. A network apparatus comprising:
a plurality of interfaces; and
a bridge interface connected to the plurality of interfaces and to access an layer 2 (L2) forwarding table to identify an interface of the plurality of interfaces to send data in a network,
wherein when a client is determined to be moving from a subnet associated with a first network element to a subnet associated with the network apparatus by evaluating a source Internet Protocol (IP) address within a Layer 3 (L3) header in a first frame to determine if the client is roaming, and when the client is determined to be roaming, the network apparatus is to configure the L2 bridge forwarding table to include a source Medium Access Control (MAC) address of the client together with information identifying one of the plurality of interfaces, and the bridge interface is to direct client data traffic back towards the subnet associated with the first network element through the one of the plurality of interfaces,
wherein an encapsulation tunnel is associated with the first network element and the network apparatus prior to the client moving from the subnet associated with the first network.

15. The network apparatus of claim 14, wherein the client data traffic is tunneled from the network apparatus to the first network element via the encapsulation tunnel.

16. The network apparatus of claim 14, wherein the network apparatus is a service controller.

17. The network apparatus of claim 14, wherein the network apparatus is a bridge.

18. The network apparatus of claim 14, wherein the L2 bridge forwarding table also includes information identifying a source interface of the plurality of interfaces for use in receiving data traffic returned towards the subnet associated with the network apparatus.

19. A non-transitory computer readable medium including machine readable instructions that when executed by a processor are to:
when a client is determined to be moving from a subnet associated with a first network element to a subnet associated with a second network element by evaluating a source Internet Protocol (IP) address within a Layer 3 (L3) header in a first frame to determine if the client is roaming, and when the client is determined to be roaming, configure an layer 2 (L2) bridge forwarding table in the second network element to include a source Medium Access Control (MAC) address of the client together with information identifying an interface for use in directing client data traffic back towards the subnet associated with the first network element,
wherein an encapsulation tunnel is associated with the first network element and the network apparatus prior to the client moving from the subnet associated with the first network.

20. The non-transitory compute readable medium of claim 19, wherein the method comprises directing the client data traffic in the first frame towards the subnet associated with the first network element via the interface associated with the source MAC address via the encapsulation tunnel.

* * * * *

UNITED STATES PATENT AND TRADEMARK OFFICE
CERTIFICATE OF CORRECTION

| | |
|---|---|
| PATENT NO. | : 8,503,396 B2 |
| APPLICATION NO. | : 13/198084 |
| DATED | : August 6, 2013 |
| INVENTOR(S) | : Richard H. Blanchette et al. |

Page 1 of 1

It is certified that error appears in the above-identified patent and that said Letters Patent is hereby corrected as shown below:

In the Claims

In column 30, line 48, in Claim 4, delete "Rounding" and insert -- Routing --, therefor.

In column 31, line 4, in Claim 11, delete "claim 1," and insert -- claim 8, --, therefor.

In column 31, line 24, in Claim 14, delete "apparatus by" and insert -- apparatus, --, therefor.

In column 32, line 19, in Claim 19, delete "element by" and insert -- element, --, therefor.

In column 32, line 33, in Claim 20, delete "compute" and insert -- computer --, therefor.

Signed and Sealed this
Nineteenth Day of November, 2013

Teresa Stanek Rea
*Deputy Director of the United States Patent and Trademark Office*